US012811865B2

(12) United States Patent
Chen et al.

(10) Patent No.: US 12,811,865 B2
(45) Date of Patent: Nov. 24, 2026

(54) METHOD AND APPARATUS FOR RECONFIGURING ARTIFICIAL INTELLIGENCE AND MACHINE LEARNING FUNCTIONALITIES IN A WIRELESS COMMUNICATION SYSTEM

(71) Applicant: ASUS Technology Licensing Inc., Taipei City (TW)

(72) Inventors: Cheng-Hsiu Chen, Taipei City (TW); Chun-Wei Huang, Taipei City (TW); Li-Chih Tseng, Taipei City (TW); Meng-Hui Ou, Taipei City (TW)

(73) Assignee: ASUS Technology Licensing Inc., Taipei City (TW)

( * ) Notice: Subject to any disclaimer, the term of this patent is extended or adjusted under 35 U.S.C. 154(b) by 0 days.

(21) Appl. No.: 19/442,894

(22) Filed: Jan. 7, 2026

(65) Prior Publication Data

US 2026/0197261 A1 Jul. 9, 2026

Related U.S. Application Data

(60) Provisional application No. 63/742,951, filed on Jan. 8, 2025.

(51) Int. Cl.

*H04L 43/065* (2022.01)
*H04B 7/06* (2006.01)
*H04L 41/16* (2022.01)

(52) U.S. Cl.

CPC ......... *H04L 43/065* (2013.01); *H04B 7/0626* (2013.01); *H04L 41/16* (2013.01)

(58) Field of Classification Search

CPC . G06N 20/00; G06N 3/08; G06N 3/09; H04L 41/16; H04L 43/065; H04B 7/0626; H04B 17/373; H04B 17/3913

See application file for complete search history.

(56) References Cited

U.S. PATENT DOCUMENTS

2024/0098533 A1 3/2024 Leng et al.
2025/0219898 A1* 7/2025 Li ...................... H04L 41/0803
(Continued)

FOREIGN PATENT DOCUMENTS

WO 2024210809 A1 10/2024
WO WO-2024210796 A1 * 10/2024 ............ G06N 3/045
(Continued)

OTHER PUBLICATIONS

U.S. Appl. No. 63/667,868 (Year: 2024).*
(Continued)

*Primary Examiner* — Mong-Thuy T Tran

(74) *Attorney, Agent, or Firm* — Skaar Ulbrich Macari, P.A.

(57) ABSTRACT

Methods, systems, and apparatuses are provided for reconfiguring artificial intelligence and machine learning functionalities in a wireless communication system, wherein a method of a User Equipment (UE) comprises receiving a first reconfiguration message from a Network (NW), and determining whether to report applicability information for at least one prediction configuration, among one or more prediction configurations, in a second message, to the NW, based on at least whether the UE is indicated to report for the at least one prediction configuration.

18 Claims, 13 Drawing Sheets

(56) References Cited

U.S. PATENT DOCUMENTS

| | | | | |
|---|---|---|---|---|
| 2025/0233805 | A1* | 7/2025 | Li | H04W 8/22 |
| 2025/0254531 | A1* | 8/2025 | Shrivastava | H04W 24/02 |
| 2025/0254532 | A1* | 8/2025 | Shrivastava | H04W 24/02 |
| 2026/0032481 | A1* | 1/2026 | Fehrenbach | H04W 24/08 |
| 2026/0101240 | A1* | 4/2026 | Shrivastava | H04W 36/0058 |
| 2026/0129713 | A1* | 5/2026 | Chen | H04W 76/27 |
| 2026/0180650 | A1* | 6/2026 | Khan Beigi | H04B 7/0626 |

FOREIGN PATENT DOCUMENTS

| | | | | | |
|---|---|---|---|---|---|
| WO | WO-2025178538 | A1 | * | 8/2025 | G06N 3/045 |
| WO | WO-2026010549 | A1 | * | 1/2026 | G06N 3/08 |
| WO | WO-2026033352 | A1 | * | 2/2026 | G06N 3/08 |
| WO | WO-2026124957 | A1 | * | 6/2026 | |

OTHER PUBLICATIONS

Office Action to the corresponding European patent application rendered by the European Patent Office (EPO) on Jun. 17, 2026, 10 pages.

Nokia; LCM for UE-sided model for Beam Management; 3GPP TSG-RAN WG2 Meeting #127; R2-2407066; indicated as retrieved on Aug. 9, 2024, 11 pages.

Huawei, HiSilicon; Discussion on LCM for UE-sided model for Beam Management use case; 3GPP TSG-RAN WG2 Meeting #128; R2-2410492; indicated as retrieved on Nov. 8, 2024, 11 pages.

Lenovo; LCM for UE-sided model in beam management; 3GPP TSG-RAN WG2 #127; R2-2406876; indicated as retrieved on Aug. 9, 2024, 6 pages.

* cited by examiner

1. CSI-ReportConfig(s) configured in a first list.
   CSI-MeasConfig -> csi-ReportConfigToAddModList -> CSI-ReportConfig
2. CSI-ReportConfig(s) configured in a second list.
   CSI-MeasConfig -> aiml-CSI-ReportConfigToAddModList-r19 -> CSI-ReportConfig
3. Set(s) of inference related parameters (e.g., aiml-FunctionalityContainer) configured in a third list.
   CSI-MeasConfig -> aiml-FunctionalityToAddModList-r19 -> aiml-FunctionalityContainer
   aiml-FunctionalityContainer: {containerID: 0, associatedID: 0, setA: 0, setB: 1, subcase: spatial}
   aiml-FunctionalityToAddModList-r19 : [
   {containerID: 0, associatedID: 0, setA: 0, setB: 1, subcase: spatial},
   {containerID: 1, associatedID: 0, setA: 1, setB: 2, subcase: spatial},
   {containerID: 2, associatedID: 1, setA: 0, setB: 1, subcase: spatial},
   {containerID: 3, associatedID: 1, setA: 1, setB: 2, subcase: spatial}
   ]
4. Options for parameter(s)
   CSI-MeasConfig -> aiml-FunctionalityContainer
   aiml-FunctionalityContainer: {
   associatedID: [0, 1, 2],
   setA: [0, 1, 2],
   setB: [0, 1, 2],
   subcase: [spatial, temporal]
   }
5. Option(s) provided within set(s) of inference related parameters (e.g., aiml-FunctionalityContainer) or CSI-ReportConfig(s)
   [
   {containerID: 0, associatedID: 0, setA: 0, setB: [1, 2, 3], subcase: spatial},
   {containerID: 1, associatedID: 0, setA: 0, setB: [1, 2], subcase: spatial}
   ]
6. Indication(s) provided in container(s) or CSI-ReportConfig(s)
   [
   aiml-FunctionalityContainer:
   {containerID: 0, associatedID: 0, setA: 0, setB: [*empty], subcase: [*empty]},
   {containerID: 1, associatedID: 0, setA: 0, ~~setB: [*empty], subcase: [*empty]~~}
   ]
7. List of lists may be used to group set(s) of inference related parameters or CSI-ReportConfig(s)
   [
   [CSI-ReportConfig 0, CSI-ReportConfig 1, CSI-ReportConfig 2],
   [CSI-ReportConfig 3, CSI-ReportConfig 4, CSI-ReportConfig 5]
   ]
8. ID(s) (e.g., group ID) may be used to group set(s) of inference related parameters or CSI-ReportConfig(s)
   [
   {containerID: 0, groupID: 0, associatedID: 0, setA: 0, setB: 1, subcase: spatial},
   {containerID: 1, groupID: 0, associatedID: 0, setA: 0, setB: 2, subcase: spatial},
   {containerID: 2, groupID: 1, associatedID: 0, setA: 0, setB: 2, subcase: temporal}
   ]

FIG. 9

1. Report IDs (based on step 3, e.g., CSI-ReportConfigId, containerID, associatedID, group ID)
   - applicable-functionaities: [0, 1]
   - non-applicable-functionalities: [2, 3]
   - functionalities-applicability: [{0: applicable}, {1: applicable}, {2: non-applicable}, {3: non-applicable}]
2. Report set(s) of inference related parameters
   aiml-FunctionalityContainer: {containerID: 0, associatedID: 0, setA: 0, setB: 1, subcase: spatial}
   aiml-FunctionalityContainer (with options): {containerID: 0, associatedID: 0, setA: 0, setB: [1, 2, 3], subcase: spatial}
   - applicable-functionalities: [aiml-FunctionalityContainer 0, aiml-FunctionalityContainer (with options) 1]
   - non-applicable-functionalities: [aiml-FunctionalityContainer 2, aiml-FunctionalityContainer (with options) 3]
3. Report selected parameter(s)
   - applicable-functionality: {
     associatedID: [0, 1],
     setA: [0, 1],
     setB: [1, 2],
     subcase: [temporal]
   }
   - non-applicable-functionality: {
     associatedID: [2],
     setA: [2],
     setB: [0],
     subcase: [spatial]
   }
4. Report ID along with selected parameter(s)
   - applicable functionalities: [
     {ID: 0, setB: [1]},
     {ID: 1, setB: [1, 2, 3]}
   ]

FIG. 10

METHOD AND APPARATUS FOR RECONFIGURING ARTIFICIAL INTELLIGENCE AND MACHINE LEARNING FUNCTIONALITIES IN A WIRELESS COMMUNICATION SYSTEM

CROSS-REFERENCE TO RELATED APPLICATIONS

The present Application claims priority to and the benefit of U.S. Provisional Patent Application Ser. No. 63/742,951, filed Jan. 8, 2025, which is hereby fully incorporated herein by reference.

FIELD

This disclosure generally relates to wireless communication networks and, more particularly, to a method and apparatus for reconfiguring artificial intelligence and machine learning functionalities in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for reconfiguring artificial intelligence and machine learning functionalities in a wireless communication system. As such, a User Equipment (UE) may efficiently report the applicability of Artificial Intelligence/Machine Learning (AI/ML) functionalities.

In various embodiments, a method of a User Equipment (UE) comprises receiving a first reconfiguration message from an NW, and determining whether to report applicability information for at least one prediction configuration, among one or more prediction configurations, in a second message, to the NW, based on at least whether the UE is indicated to report for the at least one prediction configuration, in accordance with embodiments of the present invention.

In various embodiments, a method of an NW comprises transmitting a first reconfiguration message to a UE, and indicating whether to report applicability information for at least one prediction configuration, among one or more prediction configurations, to the UE.

BRIEF DESCRIPTION OF THE DRAWINGS

FIG. 9 shows and example of step 3 of the AI/ML procedure, in accordance with embodiments of the present invention.

FIG. 10 shows an example of step 4 of the AI/ML procedure, in accordance with embodiments of the present invention.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WIMAX®, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] RP-240082, "Revised SID on AIML for mobility in NR"; [2] RP-240774, "Revised WID for NR_AIML_air"; [3] 3GPP TR 38.843 V18.0.0 (2023 December) 3GPP; TSG RAN; Study on Artificial Intelligence (AI)/Machine Learning (ML) for NR air interface (Release 18); [4] 3GPP TS 38.331 V18.1.0 (2024 March) 3GPP; TSG RAN; NR; Radio Resource Control (RRC) protocol specification (Release 18); [5] Report for RAN2 #127bis; and [6] Report for RAN1 #119. The standards and documents listed above are hereby expressly and fully incorporated herein by reference in their entirety.

Figure 1:
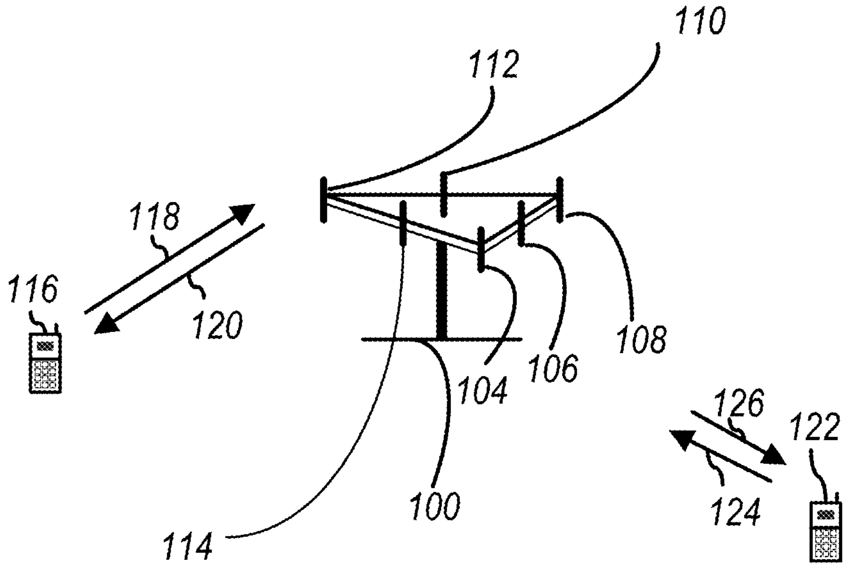
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
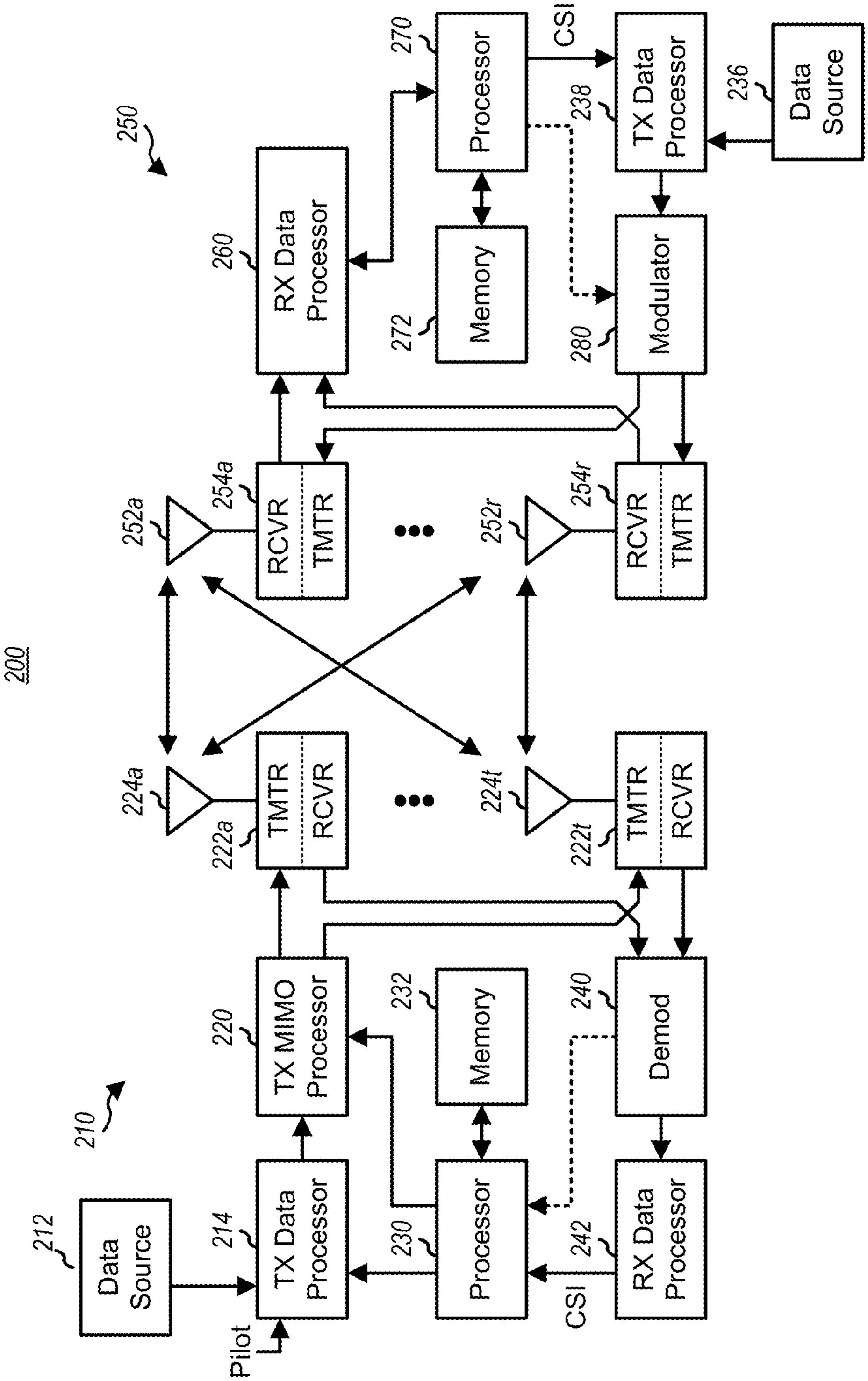
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At receiver system 250, the transmitted modulated signals are received by $N_R$ antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254*a* through 254*r*, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
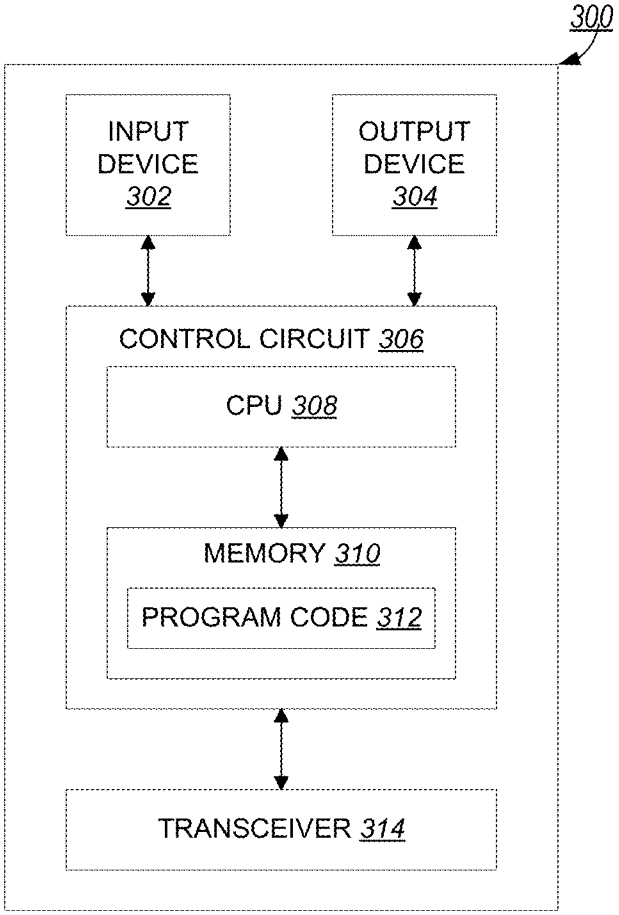
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
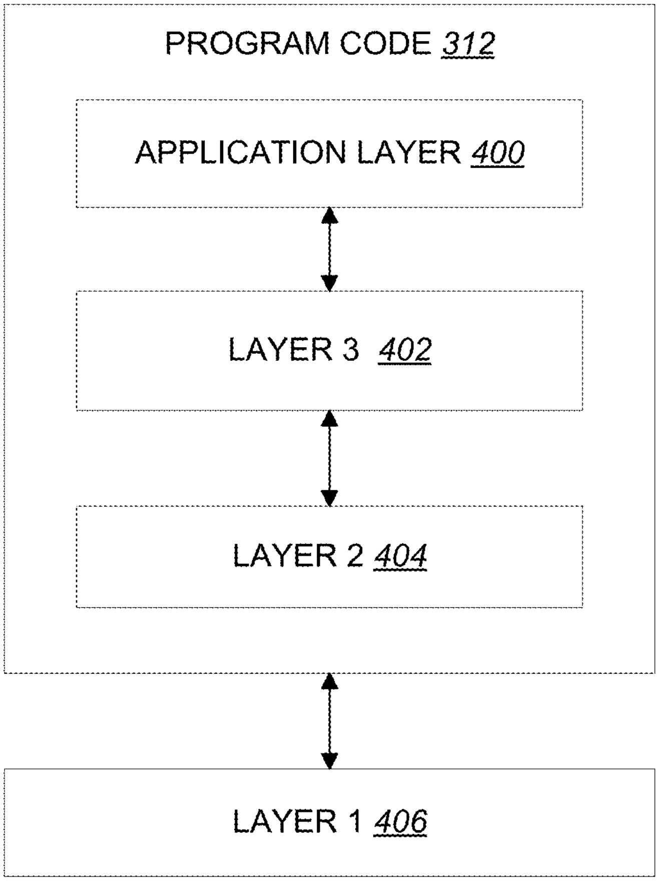
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-) bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

In SID RP-240082 [1], the objectives of AI/ML Mobility are specified:

Start of Quotation [1]

3 Justification

With existing L3 handover mechanism, handover is triggered and executed based on reported historical measurement result and/or measurement event(s) i.e., it is kind of reactive scheme by its nature. It may work well among macro cells when UE's mobility is low for existing services. But it could be problematic when either UE's mobility is high or among micro cells of high density or both for existing services or future services e.g. XR, where such reactive scheme may result in more unintended event e.g., handover failure, radio link failure, Ping-Pong phenomenon, throughput loss or too early/late handover etc. To improve handover robustness conditional handover is introduced in Rel-16. And to reduce interruption time of frequent handover among small cells LTM HO is introduced in Rel-18. However, these two mechanisms are not sufficient because they are still reactive scheme by design. On the other hand, mechanism based on AI/ML algorithm has the potential to enable proactive scheme.

In Rel-18 SID called FS_NR_AIML_air was studied extensively on physical layer centric use cases including spatial and temporal beam prediction. Temporal prediction within serving cell is mainly to predict the best or top-K beam(s) or beam pair(s) in time domain in order to improve UE throughput. While predict the best or top-K beam(s) or beam pair(s) among a set of beams by measuring a smaller set of beams could help reduce RS signalling overhead, measurement efforts and UE power consumption etc. By extended L1 beam measurement from serving cell to neighbouring cell, majority of the RAN1 work can be reused. Since L3 measurement is based on filtering of L1 measurement, the study of AI/ML for air can be leveraged for mobility purpose e.g., temporal prediction can also be used to predict beam(s)/cell(s) becoming worse so that unintended event like radio link failure or short-stay handover can be avoided.

Mobility enhancement was also studied in RAN3 in Rel-17 in SID called FS_NR_ENDC_data_collect and is now specified in Rel-18 WID NR_AIML_NGRAN-Core. In these RAN3 items the study and normative work on mobility enhancement is based on information available in network side e.g. handover and stay of time in history among cells to predict UE's trajectory in single hop and hence potential candidates. In Rel-19 RAN3 will further work on UE's trajectory for multiple hops. The predicted UE's trajectory could be helpful for study on AI/ML mobility over air interface to some extent.

Based on progress made in RAN1 and RAN3 so far and assumption on UE's trajectory it is feasible to predict RRM measurement and/or event and hence candidate target cell in UE side. In network side new assistant information, if necessary, and statistics information based on measurement report from UE and/or neighbouring nodes can be also used for smart prediction. If some prediction information could be known by network, handover and/or RRM performance can be improved by proactive measures to either make a better decision or avoid unintended event.

4 Objective 4.1 Objective of SI or Core Part WI or Testing Part WI

The study will focus on mobility enhancement in RRC-_CONNECTED mode over air interface by following existing mobility framework, i.e., handover decision is always made in network side. Mobility use cases focus on standalone NR PCell change. UE-side and network-side AI/ML model can be both considered, respectively.

Study and evaluate potential benefits and gains of AI/ML aided mobility for network triggered L3-based handover, considering the following aspects:

AI/ML based RRM measurement and event prediction,

Cell-level measurement prediction including intra and inter-frequency (UE sided and NW sided model) [RAN2]

Inter-cell Beam-level measurement prediction for L3 Mobility (UE sided and NW sided model) [RAN2]

HO failure/RLF prediction (UE sided model) [RAN2]

Measurement events prediction (UE sided model) [RAN2]

Study the need/benefits of any other UE assistance information for the network side model [RAN2]

The evaluation of the AI/ML aided mobility benefits should consider HO performance KPIs (e.g., Ping-pong HO, HOF/RLF, Time of stay, Handover interruption, prediction accuracy, and measurement reduction) etc.) and complexity tradeoffs [RAN2]

NOTE: Simulation assumption and methodology can leverage TR 38.901, 38.843 and 36.839. And leave the detail discussion to RAN2

Potential AI mobility specific enhancement should be based on the Rel19 AI/ML-air interface WID general framework (e.g. LCM, performance monitoring etc) [RAN2]

NOTE: This would only be treated after sufficient progress is made in the Rel-19 AI/ML air interface WID Potential specification impacts of AI/ML aided mobility [RAN2]

End of Quotation [1]

In WID RP-240774 [2], the objectives of AI/ML for NR air interface are specified:

Start of Quotation [2]

3 Justification

The application of AI/ML techniques to NR air interface has been studied in FS_NR_AIML_Air.

In this work item, we provide the normative support for the general framework for AI/ML for air interface, as well as, enable the recommended use cases in the preceding study. In addition, a number of study objectives in this project will tackle some outstanding issues identified during the study in an attempt to deepen the understanding in view of future normative work.

4 Objective 4.1 Objective of SI or Core part WI or Testing part WI

Provide specification support for the following aspects:

AI/ML general framework for one-sided AI/ML models within the realm of what has been studied in the FS_NR_AIML_Air project [RAN2]:

Signalling and protocol aspects of Life Cycle Management (LCM) enabling functionality and model (if justified) selection, activation, deactivation, switching, fallback Identification related signalling is part of the above objective Necessary signalling/mechanism(s) for LCM to facilitate model training, inference, performance monitoring, data collection (except for the purpose of CN/OAM/OTT collection of UE-sided model training data) for both UE-sided and NW-sided models Signalling mechanism of applicable functionalities/models Beam management-DL Tx beam prediction for both UE-sided model and NW-sided model, encompassing [RAN1/RAN2]:

Spatial-domain DL Tx beam prediction for Set A of beams based on measurement results of Set B of beams ("BM-Case1")

Temporal DL Tx beam prediction for Set A of beams based on the historic measurement results of Set B of beams ("BM-Case2")

Specify necessary signalling/mechanism(s) to facilitate LCM operations specific to the Beam Management use cases, if any Enabling method(s) to ensure consistency between training and inference regarding NW-side additional conditions (if identified) for inference at UE NOTE: Strive for common framework design to support both BM-Case1 and BM-Case2

End of Quotation [2]

In TR 38.843 [3], a general framework and operations for Life Cycle Management (LCM) is studied:

Start of Quotation [3]

4 General AI/ML Framework

The purpose of this clause is to identify common notation and terminology for AI/ML related functions, procedures and interfaces.

4.1 Description of AI/ML stages

In this clause, the defining stages of AI/ML related algorithms and associated complexity are characterized, namely:

Model generation, e.g., model training (including input/output, pre-/post-process, online/offline as applicable), model validation, model testing, as applicable Inference operation, e.g., input/output, pre-/post-process, as applicable In addition, the treatment of dataset(s) for training, validation, testing, and inference is documented.

4.2 Life Cycle Management

In this clause, the life cycle management (LCM) of AI/ML model (e.g., model training, model deployment, model inference, model monitoring, model updating) and AI/ML functionality are characterized.

The following aspects, including the definition of components (if needed) and necessity, are studied in LCM:

Data collection

Note: This also includes associated assistance information, if applicable.

Model training

Functionality/model identification

Model delivery/transfer

- Model inference operation
- Functionality/model selection, activation, deactivation, switching, and fallback operation.
  - Including: Decision by the network (either network initiated or UE-initiated and requested to the network), decision by the UE (event-triggered as configured by the network, UE's decision reported to the network, or UE-autonomous either with UE's decision reported to the network or without it)
- Functionality/model monitoring
- Model update
- UE capability 4.2.1 LCM Flavours The LCM procedure is studied for the case that an AI/ML model has a model ID with associated information and/or for the case that a given functionality is provided by some AI/ML operations. Note: Applicability of functionality-based LCM and model-ID-based LCM is a separate discussion.

From RAN1 perspective, an AI/ML model identified by a model ID may be logical, and how it maps to physical AI/ML model(s) may be up to implementation. When distinction is necessary for discussion purposes, companies may use the term a logical AI/ML model to refer to a model that is identified and assigned a model ID, and physical AI/ML model(s) to refer to an actual implementation of such a model.

For UE-side models and UE-part of two-sided models:

For AI/ML functionality identification

- Legacy 3GPP framework of feature is taken as a starting point.
- UE indicates supported functionalities/functionality for a given sub-use-case.
  - UE capability reporting is taken as starting point.

For AI/ML model identification

- Models are identified by model ID at the Network. UE indicates supported AI/ML models.

In functionality-based LCM, network indicates activation/deactivation/fallback/switching of AI/ML functionality via 3GPP signalling (e.g., RRC, MAC-CE, DCI). Models may not be identified at the Network, and UE may perform model-level LCM. Whether and how much awareness/interaction NW should have about model-level LCM requires further study. For functionality identification, there may be either one or more than one Functionalities defined within an AI/ML-enabled feature, whereby AI/ML-enabled Feature refers to a Feature where AI/ML may be used. Note: UE may have one AI/ML model for the functionality, or UE may have multiple AI/ML models for the functionality.

For AI/ML functionality identification and functionality-based LCM of UE-side models and/or UE-part of two-sided models, functionality refers to an AI/ML-enabled Feature/FG enabled by configuration(s), where configuration(s) is(are) supported based on conditions indicated by UE capability. Correspondingly, functionality-based LCM operates based on, at least, one configuration of AI/ML-enabled Feature/FG or specific configurations of an AI/ML-enabled Feature/FG.

After functionality identification, necessity, mechanisms, for UE to report updates on applicable functionality(es) among functionality(es) are studied, where the applicable functionalities may be a subset of all functionalities. Applicable functionalities can be reported by the UE.

In model-ID-based LCM, models are identified at the Network, and Network/UE may activate/deactivate/select/switch individual AI/ML models via model ID.

For AI/ML model identification and model-ID-based LCM of UE-side models and/or UE-part of two-sided models, model-ID-based LCM operates based on identified models, where a model may be associated with specific configurations/conditions associated with UE capability of an AI/ML-enabled Feature/FG and additional conditions (e.g., scenarios, sites, and datasets) as determined/identified between UE-side and NW-side.

After model identification, necessity, mechanisms, for UE to report updates on applicable UE part/UE-side model(s), are studied, where the applicable models may be a subset of all identified models. Applicable models can be reported by the UE.

How to handle the impact of UE's internal conditions such as memory, battery, and other hardware limitations on functionality/model operations and AI/ML-enabled Feature is to be studied. Note: it does not preclude any existing solutions.

For functionality/model-ID based LCM, once functionalities/models are identified, the same or similar procedures may be used for their activation, deactivation, switching, fallback, and monitoring.

Model ID, if needed, can be used in a Functionality (defined in functionality-based LCM) for LCM operations.

End of Quotation [3]

In TS 38.331 ([4] 3GPP TS 38.331 V18.1.0 (2024 March) 3GPP), the procedure for RRCReconfiguration is specified:

Start of Quotation [4]

5.3.5 RRC Reconfiguration 5.3.5.1 General

Figure 5:
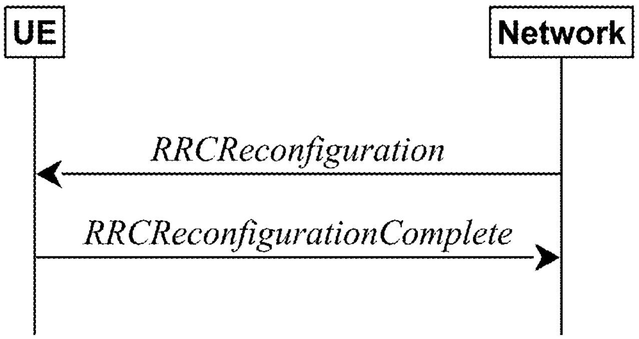
FIG. 5 (PRIOR ART)
FIG. 5 is a reproduction of FIG. 5.3.5.1-1: RRC reconfiguration, successful, from 3GPP TS 38.331 V18.1.0 (2024 March).

FIG. 5 is a reproduction of FIG. 5.3.5.1-1: RRC Reconfiguration, successful, from 3GPP TS 38.331 V18.1.0 (2024 March).

Figure 6:
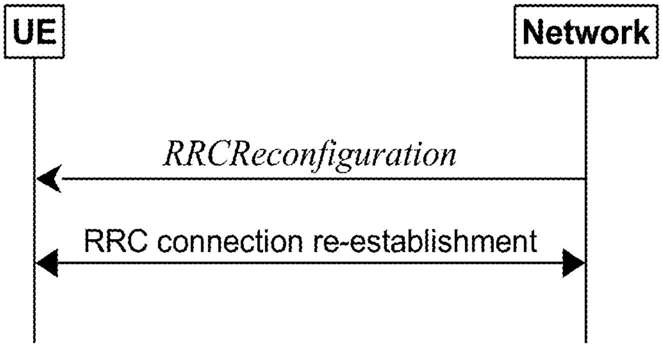
FIG. 6 (PRIOR ART)
FIG. 6 is a reproduction of FIG. 5.3.5.1-2: RRC reconfiguration, failure, from 3GPP TS 38.331 V18.1.0 (2024 March).

FIG. 6 is a reproduction of FIG. 5.3.5.1-2: RRC Reconfiguration, failure, from 3GPP TS 38.331 V18.1.0 (2024 March).

The purpose of this procedure is to modify an RRC connection, e.g. to establish/modify/release RBs/BH RLC channels/Uu Relay RLC channels/PC5 Relay RLC channels, to perform reconfiguration with sync, to setup/modify/release measurements, to add/modify/release SCells and cell groups, to add/modify/release conditional reconfiguration configuration, to add/modify/release LTM configuration, and to add/modify/release MP configuration. As part of the procedure, NAS dedicated information may be transferred from the Network to the UE.

5.3.5.3 Reception of an RRCReconfiguration by the UE

The UE shall perform the following actions upon reception of the RRCReconfiguration, upon execution of the conditional reconfiguration (CHO, CPA, CPC, or subsequent CPAC), or upon execution of an LTM cell switch:

---

...

1> if the RRCReconfiguration message includes the otherConfig:
  2> perform the other configuration procedure as specified in 5.3.5.9;

...

1> set the content of the RRCReconfigurationComplete message as follows:

...

1> else (RRCReconfiguration was received via SRB1):

...

2> submit the RRCReconfigurationComplete message via

-continued

SRB1 to lower layers for transmission using the new configuration;
...

5.3.5.9 Other Configuration

The UE shall:

1> if the received otherConfig includes the delayBudgetReportingConfig:

2> if delayBudgetReportingConfig is set to setup:

3> consider itself to be configured to send delay budget reports in accordance with 5.7.4;

2> else:

3> consider itself not to be configured to send delay budget reports and stop timer T342, if running.

5.7.4 UE Assistance Information 5.7.4.1 General

Figure 7:
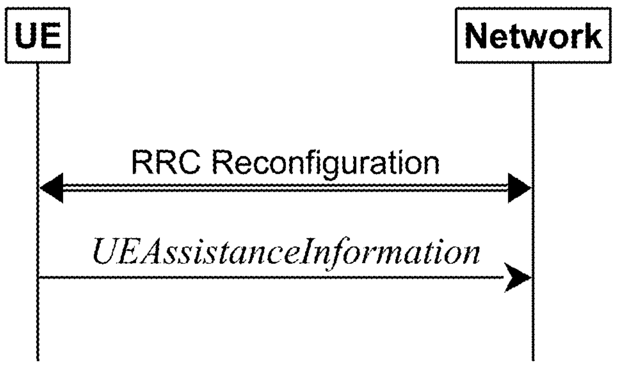
FIG. 7 (PRIOR ART)
FIG. 7 is a reproduction of FIG. 5.7.4.1-1: UE Assistance Information, from 3GPP TS 38.331 V18.1.0 (2024 March).

FIG. 7 is a reproduction of FIG. 5.7.4.1-1: UE Assistance Information, from 3GPP TS 38.331 V18.1.0 (2024 March).

The purpose of this procedure is for the UE to inform the network of:

its delay budget report carrying desired increment/decrement in the connected mode DRX cycle length; or 5.7.4.2 Initiation A UE capable of providing delay budget report in RRC_CONNECTED may initiate the procedure in several cases, including upon being configured to provide delay budget report and upon change of delay budget preference.

...
Upon initiating the procedure, the UE shall:
1> if configured to provide delay budget report:
2> if the UE did not transmit a UEAssistanceInformation message with delayBudgetReport since it was configured to provide delay budget report; or
2> if the current delay budget is different from the one indicated in the last transmission of the UEAssistanceInformation message including delayBudgetReport and timer T342 is not running:
3> start or restart timer T342 with the timer value set to the delayBudgetReportingProhibitTimer;
3> initiate transmission of the UEAssistanceInformation message in accordance with 5.7.4.3 to provide a delay budget report;
...

5.7.4.3 Actions Related to Transmission of UEAssistanceInformation Message

The UE shall set the contents of the UEAssistanceInformation message as follows:

1> if transmission of the UEAssistanceInformation message is initiated to provide a delay budget report according to 5.7.4.2 or 5.3.5.3;
2> set delayBudgetReport to type1 according to a desired value;
...
The UE shall:
...
1> else:
2> submit the UEAssistanceInformation message to lower layers for transmission.
...

6.2.2 Message Definitions

—RRCReconfiguration

The RRCReconfiguration message is the command to modify an RRC connection. It may convey information for measurement configuration, mobility control, radio resource configuration (including RBs, MAC main configuration and physical channel configuration) and AS security configuration.

Signalling radio bearer: SRB1 or SRB3

RLC-SAP: AM

Logical channel: DCCH

Direction: Network to UE

RRCReconfiguration message

```
-- ASN1START
-- TAG-RRCRECONFIGURATION-START
RRCReconfiguration ::=                SEQUENCE {
  rrc-TransactionIdentifier             RRC-TransactionIdentifier,
  criticalExtensions                    CHOICE {
    rrcReconfiguration                    RRCReconfiguration-IEs,
    criticalExtensionsFuture              SEQUENCE { }
  }
}
RRCReconfiguration-IEs ::=            SEQUENCE {
  radioBearerConfig                     RadioBearerConfig
OPTIONAL, -- Need M
  secondaryCellGroup                    OCTET STRING (CONTAINING CellGroupConfig)
OPTIONAL, -- Cond SCG
  measConfig                            MeasConfig
OPTIONAL, -- Need M
  lateNonCriticalExtension              OCTET STRING
OPTIONAL,
  nonCriticalExtension                  RRCReconfiguration-v1530-IEs
OPTIONAL
}
RRCReconfiguration-v1530-IEs ::=        SEQUENCE {
  masterCellGroup                       OCTET STRING (CONTAINING CellGroupConfig)
OPTIONAL, -- Need M
  fullConfig                            ENUMERATED {true}
OPTIONAL, -- Cond FullConfig
  dedicatedNAS-MessageList              SEQUENCE (SIZE(1..maxDRB)) OF DedicatedNAS-Message
OPTIONAL, -- Cond nonHO
  masterKeyUpdate                       MasterKeyUpdate
OPTIONAL, -- Cond MasterKeyChange
```

-continued

RRCReconfiguration message

```
  dedicatedSIB1-Delivery                OCTET STRING (CONTAINING SIB1)
OPTIONAL, -- Need N
  dedicatedSystemInformationDelivery    OCTET STRING (CONTAINING SystemInformation)
OPTIONAL, -- Need N
  otherConfig                           OtherConfig
OPTIONAL, -- Need M
  nonCriticalExtension                  RRCReconfiguration-v1540-IEs
OPTIONAL
}
RRCReconfiguration-v1540-IEs ::=      SEQUENCE {
  otherConfig-v1540                     OtherConfig-v1540
OPTIONAL, -- Need M
  nonCriticalExtension                  RRCReconfiguration-v1560-IEs
OPTIONAL
}
RRCReconfiguration-v1560-IEs ::=       SEQUENCE {
  mrdc-SecondaryCellGroupConfig          SetupRelease { MRDC-SecondaryCellGroupConfig }
OPTIONAL,   -- Need M
  radioBearerConfig2                     OCTET STRING (CONTAINING RadioBearerConfig)
OPTIONAL,   -- Need M
  sk-Counter                             SK-Counter
OPTIONAL,   -- Need N
  nonCriticalExtension                   RRCReconfiguration-v1610-IEs
OPTIONAL
}
...
```

—RRCReconfigurationComplete

The RRCReconfigurationComplete message is used to confirm the successful completion of an RRC connection reconfiguration.

Signalling radio bearer: SRB1 or SRB3

RLC-SAP: AM

Logical channel: DCCH

Direction: UE to Network

RRCReconfigurationComplete message

```
RRCReconfigurationComplete ::=            SEQUENCE {
  rrc-TransactionIdentifier                 RRC-TransactionIdentifier,
  criticalExtensions                        CHOICE {
    rrcReconfigurationComplete                RRCReconfigurationComplete-IEs,
    criticalExtensionsFuture                  SEQUENCE { }
  }
}
RRCReconfigurationComplete-IEs ::=        SEQUENCE {
  lateNonCriticalExtension                  OCTET STRING
OPTIONAL,
  nonCriticalExtension                      RRCReconfigurationComplete-v1530-IEs
OPTIONAL
}
RRCReconfigurationComplete-v1530-IEs ::= SEQUENCE {
  uplinkTxDirectCurrentList                 UplinkTxDirectCurrentList
OPTIONAL,
  nonCriticalExtension                      RRCReconfigurationComplete-v1560-IEs
OPTIONAL
}
RRCReconfigurationComplete-v1560-IEs ::= SEQUENCE {
  scg-Response                              CHOICE {
    nr-SCG-Response                           OCTET STRING (CONTAINING
RRCReconfigurationComplete),
    eutra-SCG-Response                        OCTET STRING
  }
OPTIONAL,
  nonCriticalExtension                      RRCReconfigurationComplete-v1610-IEs
OPTIONAL
}
...
```

—UEAssistanceInformation

The UEAssistanceInformation message is used for the indication of UE assistance information to the network.

Signalling radio bearer: SRB1, SRB3

RLC-SAP: AM

Logical channel: DCCH

Direction: UE to Network

UEAssistanceInformation message

```
UEAssistanceInformation ::=         SEQUENCE {
   criticalExtensions                  CHOICE {
      ueAssistanceInformation             UEAssistanceInformation-IEs,
      criticalExtensionsFuture            SEQUENCE { }
   }
}
UEAssistanceInformation-IEs ::=     SEQUENCE {
   delayBudgetReport                   DelayBudgetReport                  OPTIONAL,
   lateNonCriticalExtension            OCTET STRING                       OPTIONAL,
   nonCriticalExtension                UEAssistanceInformation-v1540-IEs  OPTIONAL
}
DelayBudgetReport::=                CHOICE {
   type1                               ENUMERATED {
                                          msMinus1280, msMinus640, msMinus320,
msMinus160, msMinus80, msMinus60, msMinus40,
                                          msMinus20, ms0, ms20, ms40, ms60, ms80, ms160, ms320,
ms640, ms1280},
   ...
}
...
```

6.3.2 Radio Resource Control Information Elements

—CSI-MeasConfig

The IE CSI-MeasConfig is used to configure CSI-RS (reference signals) belonging to the serving cell in which CSI-MeasConfig is included, channel state information reports to be transmitted on PUCCH on the serving cell in which CSI-MeasConfig is included and channel state information reports on PUSCH triggered by DCI received on the serving cell in which CSI-MeasConfig is included. See also TS 38.214, clause 5.2.

CSI-MeasConfig information element

```
CSI-MeasConfig ::=                        SEQUENCE {
   nzp-CSI-RS-ResourceToAddModList           SEQUENCE (SIZE (1..maxNrofNZP-CSI-RS-Resources)) OF NZP-CSI-
RS-Resource        OPTIONAL, -- Need N
   nzp-CSI-RS-ResourceToReleaseList          SEQUENCE (SIZE (1..maxNrofNZP-CSI-RS-Resources)) OF NZP-CSI-
RS-ResourceId      OPTIONAL, -- Need N
   nzp-CSI-RS-ResourceSetToAddModList        SEQUENCE (SIZE (1..maxNrofNZP-CSI-RS-ResourceSets)) OF NZP-
CSI-RS-ResourceSet
OPTIONAL, -- Need N
   nzp-CSI-RS-ResourceSetToReleaseList       SEQUENCE (SIZE (1..maxNrofNZP-CSI-RS-ResourceSets)) OF NZP-
CSI-RS-ResourceSetId
OPTIONAL, -- Need N
   csi-IM-ResourceToAddModList               SEQUENCE (SIZE (1..maxNrofCSI-IM-Resources)) OF CSI-IM-
Resource                OPTIONAL, -- Need N
   csi-IM-ResourceToReleaseList              SEQUENCE (SIZE (1..maxNrofCSI-IM-Resources)) OF CSI-IM-
ResourceId              OPTIONAL, -- Need N
   csi-IM-ResourceSetToAddModList            SEQUENCE (SIZE (1..maxNrofCSI-IM-ResourceSets)) OF CSI-IM-
ResourceSet           OPTIONAL, -- Need N
   csi-IM-ResourceSetToReleaseList           SEQUENCE (SIZE (1..maxNrofCSI-IM-ResourceSets)) OF CSI-IM-
ResourceSetId         OPTIONAL, -- Need N
   csi-SSB-ResourceSetToAddModList           SEQUENCE (SIZE (1..maxNrofCSI-SSB-ResourceSets)) OF CSI-SSB-
ResourceSet        OPTIONAL, -- Need N
   csi-SSB-ResourceSetToReleaseList          SEQUENCE (SIZE (1..maxNrofCSI-SSB-ResourceSets)) OF CSI-SSB-
ResourceSetId      OPTIONAL, -- Need N
   csi-ResourceConfigToAddModList            SEQUENCE (SIZE (1..maxNrofCSI-ResourceConfigurations)) OF
CSI-ResourceConfig
OPTIONAL, -- Need N
   csi-ResourceConfigToReleaseList           SEQUENCE (SIZE (1..maxNrofCSI-ResourceConfigurations)) OF
CSI-ResourceConfigId
OPTIONAL, -- Need N
   csi-ReportConfigToAddModList              SEQUENCE (SIZE (1..maxNrofCSI-ReportConfigurations)) OF CSI-
ReportConfig       OPTIONAL, -- Need N
   csi-ReportConfigToReleaseList             SEQUENCE (SIZE (1..maxNrofCSI-ReportConfigurations)) OF CSI-
ReportConfigId
   ...
}
...
```

—CSI-ReportConfig

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214, clause 5.2.1.

CSI-ReportConfig information element

```
CSI-ReportConfig ::=                    SEQUENCE {
  reportConfigId                          CSI-ReportConfigId,
  carrier                                 ServCellIndex             OPTIONAL,   -- Need S
  resourcesForChannelMeasurement          CSI-ResourceConfigId,
  csi-IM-ResourcesForInterference         CSI-ResourceConfigId      OPTIONAL,   -- Need R
  nzp-CSI-RS-ResourcesForInterference     CSI-ResourceConfigId      OPTIONAL,   -- Need R
  reportConfigType                        CHOICE {
    periodic                                SEQUENCE {
      reportSlotConfig                        CSI-ReportPeriodicityAndOffset,
      pucch-CSI-ResourceList                  SEQUENCE (SIZE (1..maxNrofBWPs)) OF PUCCH-CSI-
Resource
    },
    semiPersistentOnPUCCH                   SEQUENCE {
      reportSlotConfig                        CSI-ReportPeriodicityAndOffset,
      pucch-CSI-ResourceList                  SEQUENCE (SIZE (1..maxNrofBWPs)) OF PUCCH-CSI-
Resource
    },
    semiPersistentOnPUSCH                   SEQUENCE {
      reportSlotConfig                        ENUMERATED {sl5, sl10, sl20, sl40, sl80, sl160,
sl320},
      reportSlotOffsetList                  SEQUENCE (SIZE (1.. maxNrofUL-Allocations)) OF
INTEGER(0..32),
      p0alpha                                 P0-PUSCH-AlphaSetId
    },
    aperiodic                               SEQUENCE {
      reportSlotOffsetList                  SEQUENCE (SIZE (1..maxNrofUL-Allocations)) OF
INTEGER(0..32)
    }
  },
  reportQuantity                          CHOICE {
    none                                    NULL,
    cri-RI-PMI-CQI                          NULL,
    cri-RI-i1                               NULL,
    cri-RI-i1-CQI                           SEQUENCE {
      pdsch-BundleSizeForCSI                  ENUMERATED {n2, n4}
OPTIONAL   -- Need S
    },
    cri-RI-CQI                              NULL,
    cri-RSRP                                NULL,
    ssb-Index-RSRP                          NULL,
    cri-RI-LI-PMI-CQI                       NULL
  },
  reportFreqConfiguration                 SEQUENCE {
    cqi-FormatIndicator                     ENUMERATED { widebandCQI, subbandCQI }
OPTIONAL,   -- Need R
    pmi-FormatIndicator                     ENUMERATED { widebandPMI, subbandPMI }
OPTIONAL,   -- Need R
    csi-ReportingBand                       CHOICE {
      subbands3                               BIT STRING(SIZE(3)),
      subbands4                               BIT STRING(SIZE(4)),
      subbands5                               BIT STRING(SIZE(5)),
      subbands6                               BIT STRING(SIZE(6)),
      subbands7                               BIT STRING(SIZE(7)),
      subbands8                               BIT STRING(SIZE(8)),
      subbands9                               BIT STRING(SIZE(9)),
      subbands10                              BIT STRING(SIZE(10)),
      subbands11                              BIT STRING(SIZE(11)),
      subbands12                              BIT STRING(SIZE(12)),
      subbands13                              BIT STRING(SIZE(13)),
      subbands14                              BIT STRING(SIZE(14)),
      subbands15                              BIT STRING(SIZE(15)),
      subbands16                              BIT STRING(SIZE(16)),
      subbands17                              BIT STRING(SIZE(17)),
      subbands18                              BIT STRING(SIZE(18)),
      ...,
      subbands19-v1530                        BIT STRING(SIZE(19))
    }   OPTIONAL   -- Need S
```

-continued

CSI-ReportConfig information element

```
  }
OPTIONAL,   -- Need R
  timeRestrictionForChannelMeasurements          ENUMERATED {configured, notConfigured},
  timeRestrictionForInterferenceMeasurements     ENUMERATED {configured, notConfigured},
  codebookConfig                                 CodebookConfig
OPTIONAL,   -- Need R
  dummy                                          ENUMERATED {n1, n2}
OPTIONAL,   -- Need R
  groupBasedBeamReporting                      CHOICE {
    enabled                                      NULL,
    disabled                                     SEQUENCE {
      nrofReportedRS                             ENUMERATED {n1, n2, n3, n4}
OPTIONAL   -- Need S
    }
  },
  cqi-Table                            ENUMERATED {table1, table2, table3, table4-r17}
OPTIONAL,   -- Need R
  subbandSize                          ENUMERATED {value1, value2},
  non-PMI-PortIndication               SEQUENCE (SIZE (1..maxNrofNZP-CSI-RS-ResourcesPerConfig)) OF
PortIndexFor8Ranks OPTIONAL,   -- Need R
  ...,
}
CSI-ReportPeriodicityAndOffset ::=      CHOICE {
  slots4                                  INTEGER(0..3),
  slots5                                  INTEGER(0..4),
  slots8                                  INTEGER(0..7),
  slots10                                 INTEGER(0..9),
  slots16                                 INTEGER(0..15),
  slots20                                 INTEGER(0..19),
  slots40                                 INTEGER(0..39),
  slots80                                 INTEGER(0..79),
  slots160                                INTEGER(0..159),
  slots320                                INTEGER(0..319)
}
PortIndexFor8Ranks ::=                  CHOICE {
  portIndex8                              SEQUENCE{
    rank1-8                                 PortIndex8
OPTIONAL,   -- Need R
    rank2-8                                 SEQUENCE(SIZE(2)) OF PortIndex8
OPTIONAL,   -- Need R
    rank3-8                                 SEQUENCE(SIZE(3)) OF PortIndex8
OPTIONAL,   -- Need R
    rank4-8                                 SEQUENCE(SIZE(4)) OF PortIndex8
OPTIONAL,   -- Need R
    rank5-8                                 SEQUENCE(SIZE(5)) OF PortIndex8
OPTIONAL,   -- Need R
    rank6-8                                 SEQUENCE(SIZE(6)) OF PortIndex8
OPTIONAL,   -- Need R
    rank7-8                                 SEQUENCE(SIZE(7)) OF PortIndex8
OPTIONAL,   -- Need R
    rank8-8                                 SEQUENCE(SIZE(8)) OF PortIndex8
OPTIONAL   -- Need R
  },
  portIndex4                              SEQUENCE{
    rank1-4                                 PortIndex4
OPTIONAL,   -- Need R
    rank2-4                                 SEQUENCE(SIZE(2)) OF PortIndex4
OPTIONAL,   -- Need R
    rank3-4                                 SEQUENCE(SIZE(3)) OF PortIndex4
OPTIONAL,   -- Need R
    rank4-4                                 SEQUENCE(SIZE(4)) OF PortIndex4
OPTIONAL   -- Need R
  },
  portIndex2                              SEQUENCE{
    rank1-2                                 PortIndex2
OPTIONAL,   -- Need R
    rank2-2                                 SEQUENCE(SIZE(2)) OF PortIndex2
OPTIONAL   -- Need R
  },
  portIndex1                              NULL
}
PortIndex8::=                           INTEGER (0..7)
PortIndex4::=                           INTEGER (0..3)
PortIndex2::=                           INTEGER (0..1)
...
```

—MeasConfig

The IE MeasConfig specifies measurements to be performed by the UE, and covers intra-frequency, inter-frequency and inter-RAT mobility as well as configuration of measurement gaps.

MeasConfig Information Element

```
MeasConfig ::=                     SEQUENCE {
  measObjectToRemoveList             MeasObjectToRemoveList
OPTIONAL,              -- Need N
  measObjectToAddModList             MeasObjectToAddModList
OPTIONAL,              -- Need N
  reportConfigToRemoveList           ReportConfigToRemoveList
OPTIONAL,              -- Need N
  reportConfigToAddModList           ReportConfigToAddModList
OPTIONAL,              -- Need N
  measIdToRemoveList                 MeasIdToRemoveList
OPTIONAL,              -- Need N
  measIdToAddModList                 MeasIdToAddModList
OPTIONAL,              -- Need N
  s-MeasureConfig                    CHOICE {
    ssb-RSRP                           RSRP-Range,
    csi-RSRP                           RSRP-Range
  }
OPTIONAL,              -- Need M
  quantityConfig                     QuantityConfig
OPTIONAL,              -- Need M
  measGapConfig                      MeasGapConfig
OPTIONAL,              -- Need M
  measGapSharingConfig               MeasGapSharingConfig
OPTIONAL,              -- Need M
  ...,
  [[
  interFrequencyConfig-NoGap-r16     ENUMERATED {true}
OPTIONAL               -- Need R
  ]],
  [[
  effectiveMeasWindowConfig-r18      SetupRelease {MeasWindowConfig-r18}
OPTIONAL               -- Need M
  ]]
}
MeasObjectToRemoveList ::=           SEQUENCE (SIZE (1..maxNrofObjectId)) OF MeasObjectId
MeasIdToRemoveList ::=               SEQUENCE (SIZE (1..maxNrofMeasId)) OF MeasId
ReportConfigToRemoveList ::=         SEQUENCE (SIZE (1..maxReportConfigId)) OF ReportConfigId
...
```

—MeasIdToAddModList

The IE MeasIdToAddModList concerns a list of measurement identities to add or modify, with for each entry the measId, the associated measObjectId and the associated reportConfigId.

MeasIdToAddModList Information Element

```
MeasIdToAddModList ::=     SEQUENCE (SIZE (1..maxNrofMeasId))
                           OF MeasIdToAddMod
MeasIdToAddMod ::=         SEQUENCE {
  measId                     MeasId,
```

-continued

```
  measObjectId               MeasObjectId,
  reportConfigId             ReportConfigId
}
...
```

—MeasObjectNR

The IE MeasObjectNR specifies information applicable for SS/PBCH block(s) intra/inter-frequency measurements and/or CSI-RS intra/inter-frequency measurements.

MeasObjectNR Information Element

```
-- ASN1START
-- TAG-MEASOBJECTNR-START
MeasObjectNR ::=                       SEQUENCE {
  ssbFrequency                           ARFCN-ValueNR
OPTIONAL,  -- Cond SSBorAssociatedSSB
  ssbSubcarrierSpacing                   SubcarrierSpacing
OPTIONAL,  -- Cond SSBorAssociatedSSB
  smtc1                                  SSB-MTC
OPTIONAL,  -- Cond SSBorAssociatedSSB
  smtc2                                  SSB-MTC2
OPTIONAL,  -- Cond IntraFreqConnected
```

-continued

```
  refFreqCSI-RS                     ARFCN-ValueNR
OPTIONAL,  -- Cond CSI-RS
  referenceSignalConfig             ReferenceSignalConfig,
  absThreshSS-BlocksConsolidation   ThresholdNR
OPTIONAL,  -- Need R
  absThreshCSI-RS-Consolidation     ThresholdNR
OPTIONAL,  -- Need R
  nrofSS-BlocksToAverage            INTEGER (2..maxNrofSS-BlocksToAverage)
OPTONAL,   -- Need R
  nrofCSI-RS-ResourcesToAverage     INTEGER (2..maxNrofCSI-RS-ResourcesToAverage)
OPTONAL,   -- Need R
  quantityConfigIndex               INTEGER (1..maxNrofQuantityConfig),
  offsetMO                          Q-OffsetRangeList,
  cellsToRemoveList                 PCI-List
OPTIONAL,  -- Need N
  cellsToAddModList                 CellsToAddModList
OPTIONAL,  -- Need N
  excludedCellsToRemoveList         PCI-RangeIndexList
OPTIONAL,  -- Need N
  excludedCellsToAddModList         SEQUENCE (SIZE (1..maxNrofPCI-Ranges)) OF PCI-RangeElement
OPTIONAL,  -- Need N
  allowedCellsToRemoveList          PCI-RangeIndexList
OPTIONAL,  -- Need N
  allowedCellsToAddModList          SEQUENCE (SIZE (1..maxNrofPCI-Ranges)) OF PCI-RangeElement
OPTIONAL,  -- Need N
  ...,
}
ReferenceSignalConfig::=          SEQUENCE {
  ssb-ConfigMobility                SSB-ConfigMobility
OPTIONAL,  -- Need M
  csi-rs-ResourceConfigMobility     SetupRelease { CSI-RS-ResourceConfigMobility }
OPTIONAL   -- Need M
}
SSB-ConfigMobility::=             SEQUENCE {
  ssb-ToMeasure                     SetupRelease { SSB-ToMeasure }
OPTIONAL,  -- Need M
  deriveSSB-IndexFromCell           BOOLEAN,
  ss-RSSI-Measurement               SS-RSSI-Measurement
OPTIONAL,  -- Need M
  ...,
}
Q-OffsetRangeList ::=             SEQUENCE {
  rsrpOffsetSSB                     Q-OffsetRange          DEFAULT dB0,
  rsrqOffsetSSB                     Q-OffsetRange          DEFAULT dB0,
  sinrOffsetSSB                     Q-OffsetRange          DEFAULT dB0,
  rsrpOffsetCSI-RS                  Q-OffsetRange          DEFAULT dB0,
  rsrqOffsetCSI-RS                  Q-OffsetRange          DEFAULT dB0,
  sinrOffsetCSI-RS                  Q-OffsetRange          DEFAULT dB0
}
ThresholdNR ::=                   SEQUENCE {
  thresholdRSRP                     RSRP-Range
OPTIONAL,  -- Need R
  thresholdRSRQ                     RSRQ-Range
OPTIONAL,  -- Need R
  thresholdSINR                     SINR-Range
OPTIONAL   -- Need R
}
CellsToAddModList ::=             SEQUENCE (SIZE (1..maxNrofCellMeas)) OF CellsToAddMod
CellsToAddMod ::=                 SEQUENCE {
  physCellId                        PhysCellId,
  cellIndividualOffset              Q-OffsetRangeList
}
...
```

—MeasObjectToAddModList

The IE MeasObjectToAddModList concerns a list of measurement objects to add or modify.

MeasObjectToAddModList Information Element

```
MeasObjectToAddModList ::=        SEQUENCE (SIZE
                                  (1..maxNrofObjectId)) OF
MeasObjectToAddMod
MeasObjectToAddMod ::=            SEQUENCE {
  measObjectId                      MeasObjectId,
  measObject                        CHOICE {
    measObjectNR                      MeasObjectNR,
    ...,
    measObjectEUTRA                   MeasObjectEUTRA,
    measObjectUTRA-FDD-r16            MeasObjectUTRA-FDD-r16,
    measObjectNR-SL-r16               MeasObjectNR-SL-r16,
    measObjectCLI-r16                 MeasObjectCLI-r16,
    measObjectRxTxDiff-r17            MeasObjectRxTxDiff-r17,
    measObjectRelay-r17               SL-MeasObject-r16,
    measObjectNR-SL-r18               MeasObjectNR-SL-r18
  }
}
...
```

—ReportConfigNR

The IE ReportConfigNR specifies criteria for triggering of an NR measurement reporting event or of a CHO, CPA or CPC event or of an L2 U2N relay measurement reporting event. For events labelled AN with N equal to 1, 2 and so on, measurement reporting events and CHO, CPA or CPC events are based on cell measurement results, which can either be derived based on SS/PBCH block or CSI-RS.

Event A1: Serving becomes better than absolute threshold;

Event A2: Serving becomes worse than absolute threshold;

Event A3: Neighbour becomes amount of offset better than PCell/PSCell;

Event A4: Neighbour becomes better than absolute threshold;

Event A5: PCell/PSCell becomes worse than absolute threshold1 AND Neighbour/SCell becomes better than another absolute threshold2;

Event A6: Neighbour becomes amount of offset better than SCell;

ReportConfigNR Information Element

```
ReportConfigNR ::=                SEQUENCE {
  reportType                        CHOICE {
    periodical                        PeriodicalReportConfig,
    eventTriggered                    EventTriggerConfig,
    ...,
    reportCGI                         ReportCGI,
    reportSFTD                        ReportSFTD-NR,
    condTriggerConfig-r16             CondTriggerConfig-r16,
    cli-Periodical-r16                CLI-PeriodicalReportConfig-r16,
    cli-EventTriggered-r16            CLI-EventTriggerConfig-r16,
    rxTxPeriodical-r17                RxTxPeriodical-r17,
    reportOnScellActivation-r18       ReportOnScellActivation-r18
  }
}
EventTriggerConfig ::=            SEQUENCE {
  eventId                           CHOICE {
    eventA1                           SEQUENCE {
      a1-Threshold                      MeasTriggerQuantity,
      reportOnLeave                     BOOLEAN,
      hysteresis                        Hysteresis,
      timeToTrigger                     TimeToTrigger
    },
    eventA2                           SEQUENCE {
      a2-Threshold                      MeasTriggerQuantity,
      reportOnLeave                     BOOLEAN,
      hysteresis                        Hysteresis,
      timeToTrigger                     TimeToTrigger
    },
    eventA3                           SEQUENCE {
      a3-Offset                         MeasTriggerQuantityOffset,
      reportOnLeave                     BOOLEAN,
      hysteresis                        Hysteresis,
      timeToTrigger                     TimeToTrigger,
      useAllowedCellList                BOOLEAN
    },
    eventA4                           SEQUENCE {
      a4-Threshold                      MeasTriggerQuantity,
      reportOnLeave                     BOOLEAN,
      hysteresis                        Hysteresis,
      timeToTrigger                     TimeToTrigger,
      useAllowedCellList                BOOLEAN
    },
    eventA5                           SEQUENCE {
      a5-Threshold1                     MeasTriggerQuantity,
      a5-Threshold2                     MeasTriggerQuantity,
      reportOnLeave                     BOOLEAN,
      hysteresis                        Hysteresis,
      timeToTrigger                     TimeToTrigger,
      useAllowedCellList                BOOLEAN
    },
```

-continued

```
    eventA6                         SEQUENCE {
      a6-Offset                       MeasTriggerQuantityOffset,
      reportOnLeave                   BOOLEAN,
      hysteresis                      Hysteresis,
      timeToTrigger                   TimeToTrigger,
      useAllowedCellList              BOOLEAN
    },
    ...,
  },
  rsType                          NR-RS-Type,
  reportInterval                  ReportInterval,
  reportAmount                    ENUMERATED {r1, r2, r4, r8, r16, r32, r64, infinity},
  reportQuantityCell              MeasReportQuantity,
  maxReportCells                  INTEGER (1..maxCellReport),
  reportQuantityRS-Indexes          MeasReportQuantity
OPTIONAL,   -- Need R
  maxNrofRS-IndexesToReport       INTEGER (1..maxNrofIndexesToReport)
OPTIONAL,   -- Need R
  includeBeamMeasurements         BOOLEAN,
  reportAddNeighMeas              ENUMERATED {setup}
OPTIONAL,   -- Need R
  ...,
}
PeriodicalReportConfig ::=      SEQUENCE {
  rsType                          NR-RS-Type,
  reportInterval                  ReportInterval,
  reportAmount                    ENUMERATED {r1, r2, r4, r8, r16, r32, r64, infinity},
  reportQuantityCell              MeasReportQuantity,
  maxReportCells                  INTEGER (1..maxCellReport),
  reportQuantityRS-Indexes        MeasReportQuantity
OPTIONAL,   -- Need R
  maxNrofRS-IndexesToReport       INTEGER (1..maxNrofIndexesToReport)
OPTIONAL,   -- Need R
  includeBeamMeasurements         BOOLEAN,
  useAllowedCellList              BOOLEAN,
  ...,
}
NR-RS-Type ::=                  ENUMERATED {ssb, csi-rs}
MeasTriggerQuantity ::=         CHOICE {
  rsrp                            RSRP-Range,
  rsrq                            RSRQ-Range,
  sinr                            SINR-Range
}
MeasTriggerQuantityOffset ::=   CHOICE {
  rsrp                            INTEGER (-30..30),
  rsrq                            INTEGER (-30..30),
  sinr                            INTEGER (-30..30)
}
MeasReportQuantity ::=          SEQUENCE {
  rsrp                            BOOLEAN,
  rsrq                            BOOLEAN,
  sinr                            BOOLEAN
}
...
```

—ReportConfigToAddModList

The IE ReportConfigToAddModList concerns a list of reporting configurations to add or modify.

ReportConfigToAddModList Information Element

```
ReportConfigToAddModList ::=  SEQUENCE (SIZE
                              (1..maxReportConfigId)) OF ReportConfigToAddMod
ReportConfigToAddMod ::=      SEQUENCE {
  reportConfigId                ReportConfigId,
  reportConfig                  CHOICE {
    reportConfigNR                ReportConfigNR,
    ...,
    reportConfigInterRAT          ReportConfigInterRAT,
    reportConfigNR-SL-r16         ReportConfigNR-SL-r16
  }
}
...
```

6.3.4 Other Information Elements

—OtherConfig

The IE OtherConfig contains configuration related to miscellaneous other configurations.

OtherConfig Information Element

```
-- ASN1START
-- TAG-OTHERCONFIG-START
OtherConfig ::=                               SEQUENCE {
  delayBudgetReportingConfig                  CHOICE{
    release                                   NULL,
    setup                                     SEQUENCE{
      delayBudgetReportingProhibitTimer         ENUMERATED
{s0, s0dot4, s0dot8, s1dot6, s3, s6, s12, s30}
    }
  }
OPTIONAL                                    -- Need M
}
...
```

End of Quotation [4]

In [5] RAN2 #127bis, a procedure for the reporting of applicable functionalities have been agreed upon:

Start of Quotation [5]

8.1.2.2 LCM for UE-Sided Model for Beam Management Use Case

Including functionality identification, additional conditions and further reporting of applicable functionalities Including outcome of email discussion [POST126][032] [AI/ML PHY] LCM (Intel/Samsung)

Figure 8:
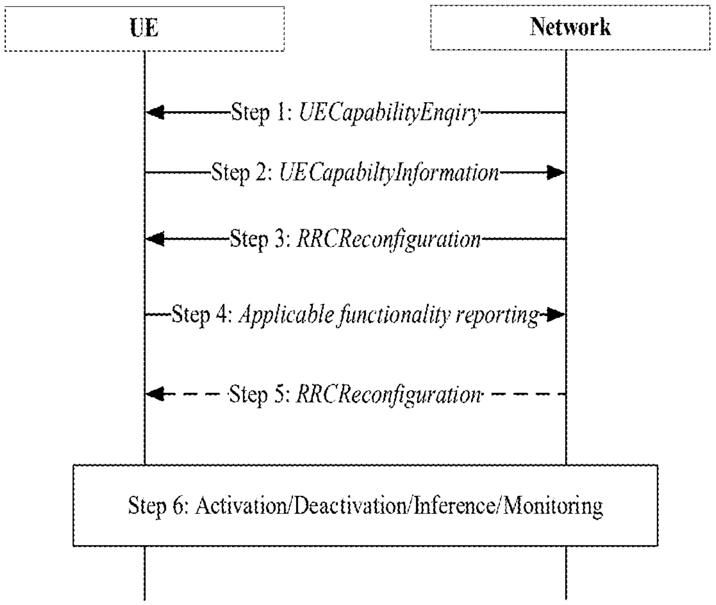
FIG. 8 (PRIOR ART)
FIG. 8 is a reproduction of the depiction in 8.1.2.2, from RAN2 #127bis.

FIG. 8 is a reproduction of the depiction in 8.1.2.2, from RAN2 #127bis.

Agreements on definitions

1. Supported functionalities refer to functionalities that UE can indicate by using UE capability information (via RRC/LPP signalling)
2. Applicable functionalities refers to functionalities that the UE is ready to apply for inference
3. Activated functionalities refers to functionalities already enabled for performing inference Agreements on procedures

- Step 1: Network sends UECapabilityEnqiry message to initiate the procedure to a UE reporting its AI/ML supported functionalities.
- Step 2: UE sends UECapablityInformation message to network, containing supported functionalities at the UE side.
- “Step 3”: Following configurations are provided from NW to UE:
  1) UE is allowed to do UAI reporting via OtherConfig.
  2) Network may provide NW-side additional condition. FFS on the RRC signalling and whether it is mandatory or optional.
  3) FFS on configuration (e.g. inference configuration) of supported functionalities. FFS on the content of configuration.
- UE decides the applicable functionalities based on NW-side additional conditions (if provided), UE-side additional conditions (internally known by UE) and model availability in device. FFS whether other configuration can considered by UE (e.g. inference configuration). FFS how the applicable functionality is decided if NW-side additional condition is not provided in step 3.
- “Step 4”: UE reports applicable functionality in the following scenarios:
  1) Upon being configured to provide applicable functionality and upon change of applicable functionality via UAI
  2) As response to NW-side additional condition requesting applicable functionality reporting in step 3, FFS other network configuration (e.g. inference configuration), FFS via UAI or RRCReconfigurationComplete, etc
- Step 5:
  1) Network configures inference configuration to UE after applicable functionality reporting, if inference configuration based on supported functionality is not provided in Step 3 (i.e. inference configuration is provided in Step 5).
  2) If inference configuration based on supported functionality is provided in Step 3, it is up to network implementation whether to provide an updated configuration or not.
- The applicable functionality may be activated by receiving its inference configuration when it is provided in Step 5. FFS the initial activation state. FFS on initial state of applicable functionality if inference configuration of supported functionality is provided in Step 3. FFS on additional L1/L2 signaling for activation/deactivation. FFS if multiple applicable functionalities can be activated at the same time. FFS what is the granularity of functionality
- We will write an LS to RAN1 to provide our agreements and ask specific questions that RAN2 needs to enable progress.

End of Quotation [5]

In [6] RAN1 #119, some agreements on the LCM for beam management have been made.

Start of Quotation [6]

R1-2410737 FL summary #4 for AI/ML in beam management Moderator (Samsung)
From Friday session Conclusion For the CSI-ReportConfig for inference configuration provided in Step 5,
- aperiodic CSI Report and semi-persistent CSI report can be activated/triggered by NW after RRCReconfigurationComplete.
- periodic CSI Report is considered as activated after RRCReconfigurationComplete.
- Note: UE is not expected to be configured with a CSI-ReportConfig for inference configuration for a non-applicable set of inference parameters or a non-applicable CSI-ReportConfig
  - Any specification impact is a separate discussion Agreement Send LS to RAN2 with below information.

RAN1 thanks RAN2 for the LS on applicable functionality reporting for beam management UE-sided model.

In RAN1's discussion of RAN 2 terminologies on beam management.
- The concept/terminology "functionality" of Supported functionalities may refer to UE-capability information/parameters i.e., Rel-19 AI/ML-enabled Features/FGs.
- The concept/terminology "functionality" of Applicable functionalities may refer to CSI-ReportConfig for inference configuration or a set of inference related parameters.
- The Activated functionalities may be enabled based on CSI framework.

Therefore, the meaning and the granularity of "functionality" for Applicable functionalities, Activated functionalities and Supported functionalities may or may not be the same.

RAN 1 made the following agreements related to the Questions from RAN 2:

---

Agreement
- In Step 3, following configurations are provided from NW to UE:
  - UE is allowed to do UAI reporting via OtherConfig,
  - The applicability report is based on A) and/or B)
    - It is up to RAN 2 to design the container
    - A) one or more of CSI-ReportConfig for inference configuration (wherein the associated ID may be configured in CSI framework as working assumption applied)
      - Note: CSI report configuration for UE-side model inference can't be activated immediately upon receiving Step 3
    - B) One set or multiple sets of inference related parameters for applicability report only (not for inference)
      - It is up to RAN2 to design the container.
      - The set of inference related parameters selected from the IEs in/or the IEs referred by CSI-ReportConfig as a starting point, e.g.,
        - the associated ID
          - Note: this doesn't imply the associated ID is mandatory
        - Set A related information
        - Set B related information
        - Report content related information
        - For BM-Case 2,
          - Time instances related information for measurements
          - Time instances related information for prediction
- In Step 4, UE reports applicability for all the above A) one or more CSI-ReportConfig and/or B) set(s) of inference related parameters
  - FFS on whether/what other information along with the applicability is needed
  - If A) is configured in Step 3,
    - Applicable aperiodic CSI Report and semi-persistent CSI report can be activated/triggered by NW after the applicability reported.
    - Applicable periodic CSI Report is considered as activated only if the applicability of the corresponding CSI-ReportConfig is reported in RRCReconfigurationComplete.
- In Step 5, NW can optionally configure CSI-ReportConfig for inference configuration in RRCReconfiguration, where the associated ID may be configured in CSI framework as working assumption applied.
  - Note: Step 5 may be optional if UE has already been configured with CSI-ReportConfig in Step 3

Agreement

For beam management, multiple CSI reports for inference for UE-side model can be configured/activated/triggered, which is up to UE capability.

Conclusion

For the CSI-ReportConfig for inference configuration provided in Step 5,
- aperiodic CSI Report and semi-persistent CSI report can be activated/triggered by NW after RRCReconfigurationComplete.
- periodic CSI Report is considered as activated after RRCReconfigurationComplete.
- Note: UE is not expected to be configured with a CSI-ReportConfig for inference configuration for a non-applicable set of inference parameters or a non-applicable CSI-ReportConfig
  - Any specification impact is a separate discussion

---

End of Quotation [6]

Artificial Intelligence/Machine Learning (AI/ML) is introduced in 5th Generation Wireless Technology (5G)-Advanced to enhance the network. For the challenging scenarios of high frequencies, rapidly changing conditions and narrow coverages of beams, AI/ML models are introduced in 5G-Advanced to pave the way into 6th Generation Wireless Technology (6G), with expectations of AI/ML models exceeding traditional methods in terms of performance.

For the air interface, Third Generation Partnership Project (3GPP) Working Group 1 (WG1) identified the following use cases to enhance: Channel State Information (CSI) feedback enhancement, beam management, and positioning accuracy enhancement. Beam management is one of the most important use cases. The current beam management procedure consists of the following steps: (1) Beam sweeping, (2) User Equipment (UE) measurement of beams, (3) UE reporting of beams. For example, the Next Generation Node B (gNB) first transmits multiple beams of different directions and angles. The UE then measures all the beams that are transmitted and determines the beams with the best measurement results (e.g., Reference Signal Received Power (RSRP) or Signal to Interference plus Noise Ratio (SINR)). The best results are reported through the CSI-Reporting framework. The UE may be configured and/or activated to perform periodic, semi-persistent, or aperiodic reporting of the beam results. The configuration and measurement for beams can be large. With AI/ML assistance, the UE may spatially predict beams to reduce the number of measurements performed. The UE may also temporally predict future beams for the challenging problem of fast changing conditions to make beam pair establishment more feasible in the Frequency Range 2 (FR2) scenarios.

For mobility, several aspects of the Layer 3 (L3) measurement framework also have enhancement potential. The current L3 handover mechanism relies on a tailored measurement configuration which utilizes measurement objects, report configurations, and measurement identities to configure the frequencies and cells for the UE to measure. The UE first measures the configured frequencies and cells, then reports the measurement results to the Network (NW), when the measurement results fulfill the report triggering conditions. The NW may reconfigure the UE to perform handover according to the triggered event type and the measurement results. The mechanism works well but is still limited to a reactive method. With the lower coverage of higher frequency, handover may occur more frequently and thus a more proactive method may be pursued. Currently, for AI/ML mobility enhancements, Radio Resource Management (RRM) measurement prediction, Radio Link Failure (RLF)/Handover Failure (HoF) prediction and measurement event prediction are studied. For RRM measurement prediction, the UE may predict measurement results of future time instances or measurement results of another cell based on historical measurements and include the predicted measurements in a measurement report. For RLF/HoF prediction, the UE may predict the chances of RLF/HoF happening within a time window (or period) before RLF/HoF actually happens. For measurement event prediction, the UE may predict the chances of a measurement event (e.g., Event A3) happening (or triggering a report, fulfilling the entering and/or leaving condition) within a time window (or period), and send a measurement report to the NW. With the assistance of AI/ML models, the UE may proactively react to potential radio problems and enhance the handover performance. Redundant measurements may also be reduced to save resources (e.g., measurement gaps, UE power).

The general framework for AI/ML procedures has been agreed upon in [5] Report for RAN2 #127bis and [6] Report for RAN1 #119. The procedure comprises at least one or more of the following steps: In the first 2 steps, the NW inquires and receives the UE capability in step 1 and step 2. FIG. 9 is an example of step 3. In step 3, the NW may provide one or more inference configurations (e.g., CSI report configuration for inference). In step 3, the NW may provide one set or multiple sets of inference related parameters. FIG. 10 is an example of step 4. In step 4, the UE may report to the NW whether the provided configuration(s) and/or set(s) of inference related parameters is applicable. The NW may reconfigure the UE in step 5 in response to step 4.

After the initial report of applicable and/or non-applicable functionalities, the UE may receive a configuration message (e.g., Radio Resource Control (RRC), RRCReconfiguration), which may include one or more functionalities (and/or configurations). For the UE, the functionality (or functionalities) and/or configuration(s) included in the RRCReconfiguration may be (currently) applicable or non-applicable.

Case 1: The configuration message (e.g., RRCReconfiguration) may be for requesting the applicability of one or more functionalities (e.g., as step 3 of the procedure for reporting the applicability for AI/ML functionalities) included in the RRCReconfiguration. The NW may expect the UE to report the applicable and/or non-applicable functionalities. Preferably in certain embodiments, in response to the configuration message, the UE reports the applicable and/or non-applicable functionalities.

Case 2: The configuration message (e.g., RRCReconfiguration) may be for configuring (e.g., add/modify) one or more applicable functionalities (previously reported to the NW) (e.g., as step 5 of the procedure for reporting the applicability for AI/ML functionalities). The NW may not expect the UE to report the applicable and/or non-applicable functionalities. Preferably in certain embodiments, in response to the configuration message, the UE does not report the applicable and/or non-applicable functionalities.

Case 3: The configuration message (e.g., RRCReconfiguration) may be for releasing (or removing) one or more functionalities (and/or configurations). The NW may not expect the UE to report the applicable and/or non-applicable functionalities. Preferably in certain embodiments, in response to the configuration message, the UE does not report the applicable and/or non-applicable functionalities.

It is not clear whether/how the UE reports the applicability status, e.g., for one or more functionalities in the reconfiguration message, for one or more functionalities already configured in the UE, in response to the reconfiguration. One RRCReconfiguration may be for multiple cases (combined). For example, one RRCReconfiguration may be for configuring a first functionality (e.g., Case 2) and for requesting the applicability of a second functionality (e.g., Case 1). For example, one RRCReconfiguration may be for configuring a first functionality (e.g., Case 2) and for configuring and requesting the applicability of a third functionality (e.g., Case 1+Case 2).

For example, the first functionality may be a functionality previously reported applicable.

For example, the second (or third) functionality may be a functionality: (1) Not previously reported (e.g., applicable or non-applicable) (2) Previously reported non-applicable; (3) Previously reported applicable (e.g., NW wants to ensure the applicability).

In at least a first example, at least one or more of the following steps may comprise:

The UE may receive (from the NW) a first configuration related to at least a first (AI/ML) functionality (e.g., for inference). The first configuration may be like step 3 described in the present disclosure.

The first functionality may be (or become) applicable when (or upon) the UE receives the first configuration. The UE may transmit a first report (e.g., initial applicability report) to the NW (e.g., based on the first configuration, in response to the first configuration, after receiving the first configuration). The first report may indicate (implicitly or explicitly) that at least an AI/ML functionality (e.g., the first functionality) is applicable. The first report may be like step 4 described in the present disclosure.

The UE may receive (from the NW) a second configuration (e.g., in response to the first report, after transmitting the first report). The second configuration may activate an AI/ML functionality (e.g., the first functionality). The second configuration may be like step 5 described in the present disclosure. The step may be optional. The AI/ML functionality (e.g., the first functionality) may be activated after the UE reports at least an AI/ML functionality (e.g., the first functionality) is applicable.

The UE may receive (from NW) a third configuration (e.g., the RRCReconfiguration described above, after receiving the second configuration, after activating the AI/ML functionality). The third configuration may reconfigure (or modify) the AI/ML functionality (e.g., the first functionality). The AI/ML functionality (e.g., the first functionality) may be currently activated in the UE. The AI/ML functionality (e.g., the first functionality) may be currently not activated in the UE. The AI/ML functionality (e.g., the first functionality) may be (or become) applicable after being reconfigured. The AI/ML functionality (e.g., the first functionality) may be (or become) not applicable after being reconfigured.

In response to the third configuration, the UE may apply the third configuration (and/or reconfigure the AI/ML functionality). It is not clear whether the UE initiates a second report (e.g., follow-up applicability report) to the NW? And the applicability of what functionality (or functionalities) should the UE report?

In at least a second example, at least one or more of the following steps may comprise:

The UE may receive (from the NW) a first configuration related to at least a second (AI/ML) functionality (e.g., for inference). The first configuration may be like step 3 described in the present disclosure.

The second functionality may be (or become) applicable when (or upon) the UE receives the first configuration. The UE may transmit a first report (e.g., initial applicability report) to the NW (e.g., based on the first configuration, in response to the first configuration, after receiving the first configuration). The first report may indicate (implicitly or explicitly) that at least an AI/ML functionality (e.g., the second functionality) is applicable. The first report may be like step 4 described in the present disclosure.

The UE may receive (from the NW) a second configuration (e.g., in response to the first report, after transmitting the first report). The second configuration may activate an AI/ML functionality (e.g., the second functionality). The second configuration may be like step 5 described in the present disclosure. The step may be optional. The AI/ML functionality (e.g., the second functionality) may be activated after the UE reports at least an AI/ML functionality (e.g., the second functionality) is applicable.

The UE may receive (from the NW) a third configuration (e.g., the RRCReconfiguration described above, after receiving the second configuration, after activating the AI/ML functionality). The third configuration may release (or remove) the AI/ML functionality (e.g., the second functionality). The AI/ML functionality (e.g., the second functionality) may be currently activated in the UE. The AI/ML functionality (e.g., the second functionality) may be currently not activated in the UE. The AI/ML functionality (e.g., the second functionality) may be (or become) applicable after being reconfigured. The AI/ML functionality (e.g., the second functionality) may be (or become) not applicable after being reconfigured.

In response to the third configuration, the UE may apply the third configuration (and/or release the AI/ML functionality). It is not clear whether the UE initiates a second report (e.g., follow-up applicability report) to the NW? And the applicability of what functionality (or functionalities) should the UE report?

In at least a third example, at least one or more of the following steps may comprise:

The UE may receive (from the NW) a first configuration related to at least a third (AI/ML) functionality (e.g., for inference). The first configuration may be like step 3 described in the present disclosure.

The third functionality may be (or become) not applicable when (or upon) the UE receives the first configuration. The UE may transmit a first report (e.g., initial applicability report) to the NW (e.g., based on the first configuration, in response to the first configuration, after receiving the first configuration). The first report may indicate (implicitly or explicitly) that at least an AI/ML functionality (e.g., the third functionality) is not applicable. The first report may be like step 4 described in the present disclosure. The UE may not indicate that the third functionality is applicable, e.g., in the first report.

The UE may receive (from the NW) a second configuration (e.g., in response to the first report, after transmitting the first report). The second configuration may not activate an AI/ML functionality (e.g., the third functionality). The second configuration may deactivate an AI/ML functionality (e.g., the third functionality). The second configuration may be like step 5 described in the present disclosure. The step may be optional. The third functionality may be not activated (e.g., after transmitting the first report).

The UE may receive (from the NW) a third configuration (e.g., the RRCReconfiguration described above, after receiving the second configuration, after activating the AI/ML functionality). The third configuration may reconfigure (or modify) the AI/ML functionality (e.g., the third functionality). The AI/ML functionality (e.g., the third functionality) may be currently not activated in the UE. The AI/ML functionality (e.g., the third functionality) may be currently deactivated in the UE. The AI/ML functionality (e.g., the third functionality) may be (or become) applicable after being reconfigured. The AI/ML functionality (e.g., the third functionality) may be (or become) not applicable after being reconfigured.

In response to the third configuration, the UE may apply the third configuration (and/or reconfigure the AI/ML functionality). It is not clear whether the UE initiates a second report (e.g., follow-up applicability report) to the NW? And the applicability of what functionality (or functionalities) should the UE report?

In at least a fourth example, at least one or more of the following steps may comprise:

The UE may receive (from NW) a first configuration related to at least a fourth (AI/ML) functionality (e.g., for inference). The first configuration may be like step 3 described in the present disclosure.

The fourth functionality may be (or become) not applicable when (or upon) the UE receives the first configuration. The UE may transmit a first report (e.g., initial applicability report) to the NW (e.g., based on the first configuration, in response to the first configuration, after receiving the first configuration). The first report may indicate (implicitly or explicitly) that at least an AI/ML functionality (e.g., the fourth functionality) is not applicable. The first report may be like step 4 described in the present disclosure. The UE may not indicate that the fourth functionality is applicable, e.g., in the first report.

The UE may receive (from the NW) a second configuration (e.g., in response to the first report, after transmitting the first report). The second configuration may not activate an AI/ML functionality (e.g., the fourth functionality). The second configuration may deactivate an AI/ML functionality (e.g., the fourth functionality). The second configuration may be like step 5 described in the present disclosure. The step may be optional. The fourth functionality may be not activated (e.g., after transmitting the first report).

The UE may receive (from the NW) a third configuration (e.g., the RRCReconfiguration described above, after receiving the second configuration, after activating the AI/ML functionality). The third configuration may release (or remove) the AI/ML functionality (e.g., the fourth functionality). The AI/ML functionality (e.g., the fourth functionality) may be currently not activated in the UE. The AI/ML functionality (e.g., the fourth functionality) may be currently deactivated in the UE. The AI/ML functionality (e.g., the fourth functionality) may be (or become) applicable after being reconfigured. The AI/ML functionality (e.g., the fourth functionality) may be (or become) not applicable after being reconfigured.

In response to the third configuration, the UE may apply the third configuration (and/or release the AI/ML functionality). It is not clear whether the UE initiates a second report (e.g., follow-up applicability report) to the NW? And the applicability of what functionality (or functionalities) should the UE report?

In at least a fifth example, at least one or more of the following steps may comprise:

The UE may receive (from the NW) a first configuration related to AI/ML functionality (e.g., for inference). The first configuration may not include a configuration related to a fifth (AI/ML) functionality. The first configuration may be like step 3 described in the present disclosure.

The UE may transmit a first report (e.g., initial applicability report) to the NW (e.g., based on the first configuration, in response to the first configuration, after receiving the first configuration). The first report may indicate (implicitly or explicitly) that at least an AI/ML functionality (e.g., not including the fifth functionality) is applicable or not applicable. The first report may be like step 4 described in the present disclosure. The step may be optional. The UE may not indicate that the fifth functionality is applicable, e.g., in the first report.

The UE may receive (from the NW) a second configuration (e.g., in response to the first report, after transmitting the first report). The second configuration may not activate an AI/ML functionality (e.g., the fifth functionality). The second configuration may be like step 5 described in the present disclosure. The step may be optional. The fifth functionality may be not activated (e.g., after transmitting the first report).

The UE may receive (from the NW) a third configuration (e.g., the RRCReconfiguration described above, after receiving the second configuration, after activating the AI/ML functionality). The third configuration may add another AI/ML functionality (e.g., the fifth functionality). The AI/ML functionality (e.g., the fifth functionality) may be currently not activated in the UE. The AI/ML functionality (e.g., the fifth functionality) may be currently deactivated in the UE. The AI/ML functionality (e.g., the fifth functionality) may be (or become) applicable after being reconfigured. The AI/ML functionality (e.g., the fifth functionality) may be (or become) not applicable after being reconfigured.

In response to the third configuration, the UE may apply the third configuration (and/or add the AI/ML functionality). It is not clear whether the UE initiates a second report (e.g., follow-up applicability report) to NW? And the applicability of what functionality (or functionalities) should the UE report?

In at least a sixth example, at least one or more of the following steps may comprise:

The UE may receive (from the NW) a first configuration related to at least a sixth (AI/ML) functionality (e.g., for inference). The first configuration may be like step 3 described in the present disclosure.

The sixth functionality may be (or become) applicable when (or upon) the UE receiving the first configuration. The UE may transmit a first report (e.g., initial applicability report) to the NW (e.g., based on the first configuration, in response to the first configuration, after receiving the first configuration). The first report may indicate (implicitly or explicitly) that at least an AI/ML functionality (e.g., the sixth functionality) is applicable. The first report may be like step 4 described in the present disclosure.

The sixth functionality may be (or become) not applicable when (or upon) the UE receives the first configuration. The UE may transmit a first report (e.g., initial applicability report) to the NW (e.g., based on the first configuration, in response to the first configuration, after receiving the first configuration). The first report may indicate (implicitly or explicitly) that at least an AI/ML functionality (e.g., the sixth functionality) is not applicable. The first report may be like step 4 described in the present disclosure. The UE may not indicate that the sixth functionality is applicable, e.g., in the first report.

The UE may receive (from the NW) a second configuration (e.g., in response to the first report, after transmitting the first report). The second configuration may activate an AI/ML functionality (e.g., the sixth functionality). The second configuration may be like step 5 described in the present disclosure. The step may be optional. The AI/ML functionality (e.g., the sixth functionality) may be activated after the UE reports at least an AI/ML functionality (e.g., the sixth functionality) is applicable.

The UE may receive (from the NW) a second configuration (e.g., in response to the first report, after transmitting the first report). The second configuration may not activate an AI/ML functionality (e.g., the sixth functionality). The second configuration may deactivate an AI/ML functionality (e.g., the sixth functionality). The second configuration may be like step 5 described in the present disclosure. The step may be optional. The sixth functionality may be not activated (e.g., after transmitting the first report).

The UE may receive (from the NW) a third configuration (e.g., the RRCReconfiguration described above, after receiving the second configuration, after activating the AI/ML functionality, after transmitting the first report). The sixth functionality may not be included in the third configuration. The third configuration may not reconfigure (or modify) the AI/ML functionality (e.g., the sixth functionality). The third configuration may not release (or remove) the AI/ML functionality (e.g., the sixth functionality). The AI/ML functionality (e.g., the sixth functionality) may be currently activated in the UE. The AI/ML functionality (e.g., the sixth functionality) may be currently not activated in the UE.

In response to the third configuration, the UE may apply the third configuration (and/or reconfigure the AI/ML functionality). It is not clear whether the UE initiates a second report (e.g., follow-up applicability report) to the NW? And the applicability of what functionality (or functionalities) should the UE report?

Figure 11:
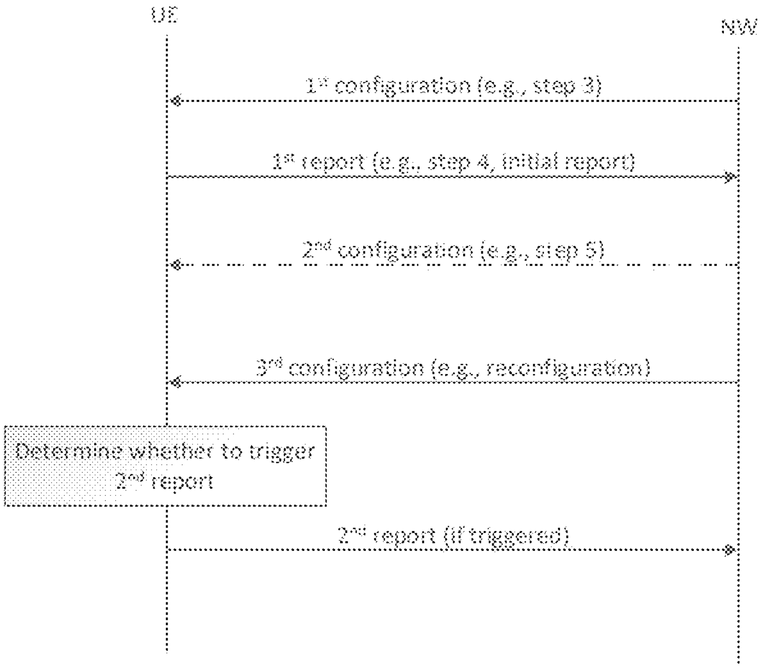
FIG. 11 is an example diagram showing a signaling flow, in accordance with embodiments of the present invention.

At least one or more of the above examples may be combined, in whole or in part. For example, the first/second/third configuration in one example may be the same as the first/second/third configuration in another example. The first/second report in one example may be the same as the first/second report in another example. The first/second/third/fourth/fifth/sixth functionality may be the same as the first/second/third/fourth/fifth/sixth functionality in another example. The first/second/third/fourth/fifth/sixth functionality may be included in the same signaling message (e.g., RRC reconfiguration). An example is shown in FIG. 11.

To at least solve the issue(s) described above, at least some method(s) described below could be used or considered, in whole or in part. At least one or more of the methods (or examples, concepts) described below may be used or considered, in whole or in part. At least one or more of the methods (or examples, concepts) may be combined, in whole or in part.

Throughout the present disclosure, a "legacy configuration" may be (replaced by) a "configuration before release 19", a "configuration without AI/ML enhancements", and/or a "configuration without release 19 (AI/ML) enhancements". An "inference configuration" may be (replaced by) a "configuration for inference" or a "configuration related to AI/ML" or a "(inference) configuration" or a "configuration comprising associatedID or being configured with associatedID" or a "configuration comprising set A and set B". A "(AI/ML) functionality" may be (replaced by) a "inference configuration", "set of inference related parameters", and/or a "configuration". A "configuration" may be (replaced by) a "legacy configuration" and/or an "inference configuration". The configuration(s) may be for CSI reporting. An inference configuration may be (replaced by) a CSI-ReportConfig for inference.

Throughout the present disclosure, a "set of parameters" may be a "set of inference related parameters". The set(s) of parameters may be for CSI reporting based on AI/ML.

Throughout the present disclosure, the terms "inference" and "prediction" may be used interchangeably.

The UE may determine to report (or not report) whether one or more functionalities (e.g., configurations) (e.g., the first/second/third/fourth/fifth/sixth functionality in the above one or more examples) are applicable (or non-applicable) (e.g., the second report in the above one or more examples) when (or in response to) receiving a (first) signaling (e.g., the third configuration in the above one or more examples). The UE may initiate/generate/transmit an applicability report (e.g., the second report in the above one or more examples) if there is at least one functionality (or configuration) that needs to be reported. The UE may not initiate/generate/transmit an applicability report (e.g., the second report in the above one or more examples) if no functionality (or configuration) needs to be reported.

The signaling (or the configuration) may be (or comprise) an RRC message (e.g., RRC reconfiguration message), a Medium Access Control (MAC) Control Element (CE) (e.g., for activation or deactivation), a Physical Layer (PHY) signaling.

The report may be (or included in) an RRC message (e.g., RRC reconfiguration complete, UE assistance information).

The determination may be based on one or more of the following:

- NW indication;
- The received (first) signaling;
- The status of the functionality before (or upon) receiving the (first) signaling;
- The status of the functionality after receiving (or applying) the (first) signaling;
- Whether the status of the functionality is changed, e.g., whether the functionality is activated (or deactivated), whether the functionality is applicable (or not applicable), whether the functionality is (to be) reconfigured (or modified), whether the functionality is (to be) added, whether the functionality is (to be) removed (or released); and/or
- Whether the status of the functionality has been reported.

In addition, at least one or more of the following may be used for further clarification:

- The (first) signaling may be L1/L2/L3 signaling (e.g., RRC message, MAC CE, or Downlink Control Information (DCI));
- The (first) signaling may include one or more configurations for one or more functionalities;
- One or more functionalities (included in the (first) signaling) may be added, modified, or removed/released;
- One or more functionalities (included in the (first) signaling) may be (currently) applicable or non-applicable (for the UE);
- The report may indicate whether one or more functionalities (included in the (first) signaling) is applicable, is non-applicable, becomes applicable (from not applicable), and/or becomes not applicable (from applicable);
- The report may not need to indicate one or more functionalities (included in the (first) signaling). Not indicating one or more functionalities (included in the (first) signaling) may not impact the NW or the UE (e.g., not impacting the alignment on whether a functionality is applicable or non-applicable, not impacting the decision making by the NW); and/or The status of a functionality may be (or comprise) at least one of: activated, deactivated, applicable, not applicable, (being) removed, (being) added, (being) modified, (being) reconfigured.

Concept A: The Determination May be Based on the Received (First) Signaling.

For example, the received (first) signaling may add, modify, and/or remove/release one or more functionalities.

For example, the UE may send or not send a (first) report to the NW when the (first) signaling includes (or in response to the (first) signaling including) one or more functionalities to add.

For example, the UE may send or not send a (second) report to the NW when the (first) signaling includes (or in response to the (first) signaling including) one or more functionalities to modify.

For example, the UE may send or not send a (third) report to the NW when the (first) signaling includes (or in response to the (first) signaling including) one or more functionalities to remove/release.

For example, the UE may send or not send when the (first) signaling includes no impact to one or more functionalities (e.g., no addition, no modification, no release, no activation/deactivation).

For example, the determination may be based on whether the functionality (or configuration) has impact on at least one of the (current) functionalities. If (at least) the functionality is not (being) added/not (being) modified/not (being) modified/not (being) reconfigured/not (being) removed (or released), the UE may or may not initiate/generate/trigger an applicability report and/or indicate whether the functionality is applicable (or not applicable).

For example, the determination may be based on whether the functionality (or configuration) is (being) added by the (first) signaling. If (at least) the functionality is (being) added, the UE may initiate/generate/trigger an applicability report and/or indicate whether the functionality is applicable (or not applicable).

For example, the determination may be based on whether the functionality (or configuration) is (being) modified (or reconfigured) by the (first) signaling. If (at least) the functionality is (being) reconfigured, the UE may initiate/generate/trigger an applicability report and/or indicate whether the functionality is applicable (or not applicable). If (at least) the functionality is (being) reconfigured, the UE may not initiate/generate/trigger an applicability report and/or not indicate whether the functionality is applicable (or not applicable). The UE may determine whether to initiate/generate/trigger an applicability report and/or indicate whether the functionality is applicable (or not applicable) based on another factor (e.g., whether the status is changed).

For example, the determination may be based on whether the functionality (or configuration) is (being) removed (or released) by the (first) signaling. If (at least) the functionality is (being) removed, the UE may not initiate/generate/trigger an applicability report and/or not indicate whether the functionality is applicable (or not applicable).

Any of the first, second, and/or third reports may be the same report, combined together, and/or sent in a same message.

Concept B: The Determination May be Based on an NW Indication.

For example, (the NW indication could be the same as the (first) signaling), the NW may indicate whether to report the applicable and/or non-applicable functionalities via the (first) signaling.

For example, the UE may send or not send a report to the NW when the (first) signaling includes (or in response to the (first) signaling including) one or more indications (or flags/parameters). The indications (or flags/parameters) may indicate whether to send or not send reports. The indications (or flags/parameters) may indicate whether to include or not include one or more functionalities in the report. Preferably in certain embodiments, each indication (or flag/parameter) could be (configured) per functionality. Each indication (or flag/parameter) may indicate whether to include or not include one (corresponding) functionality in the report. Preferably in certain embodiments, the NW indication could be a bit-map to indicate whether to include one or more functionality in a report (and/or which one or more functionalities need to be included in a report). Preferably in certain embodiments, each bit in the bit-map could refer to a (AI/ML) functionality, an inference configuration, and/or a set of inference related parameters.

For example, (the NW indication could be different than the (first) signaling), the NW indication may comprise information of Identity (ID)/index associated with one or more functionalities (or configurations) (e.g., CSI-ReportConfigID). Based on the NW indication, the UE could determine the applicability report for which one or more functionalities.

Concept C: The Determination May be Based on the Status of a Functionality.

For example, whether the functionality is activated or deactivated. "Previously" may be before the reception of the (first) signaling. "Currently" may be after the reception of the (first) signaling. The determination may be based on whether the functionality is activated (e.g., configured by an RRC message, activated by MAC CE, or activated by DCI) or deactivated (e.g., released by an RRC message, deactivated by MAC CE, or deactivated by DCI). The activation and/or deactivation may be by the NW and/or by the UE. If (at least) the functionality is (being) activated (or deactivated), the UE may initiate/generate/trigger an applicability report and/or indicate whether the functionality is applicable (or not applicable). If (at least) the functionality is not (being) activated, the UE may not initiate/generate/trigger an applicability report and/or not indicate whether the functionality is applicable (or not applicable). The functionality may be the (previously) configured functionality, and/or the (currently) configured functionality. The functionality (or functionalities) included in the report may be the (previously) configured functionality and/or the (currently) configured functionality. The functionality (or functionalities) included in the report may be the functionalities that are activated. The functionality (or functionalities) that are deactivated may not be included in the report. The functionality (or functionalities) included in the report may be the functionalities that are deactivated. The functionality (or functionalities) that are activated may not be included in the report.

For example, whether the functionality is applicable or not applicable. "Previously" may be before the reception of the (first) signaling. "Currently" may be after the reception of the (first) signaling. The determination may be based on whether the functionality is applicable or not applicable. If (at least) the functionality is (being) applicable (or not applicable), the UE may initiate/generate/trigger an applicability report and/or indicate whether the functionality is applicable (or not applicable). If (at least) the functionality is (being) not applicable, the UE may not initiate/generate/trigger an applicability report and/or not indicate whether the functionality is applicable (or not applicable). The functionality may be the (previously) configured functionality, and/or the (currently) configured functionality. The functionality (or functionalities) included in the report may be the (previously) configured functionality and/or the (currently) configured functionality. The functionality (or functionalities) included in the report may be the functionalities that are applicable. The functionality (or functionalities) that are not applicable may not be included in the report. The functionality (or functionalities) included in the report may be the functionalities that are not applicable. The functionality (or functionalities) that are applicable may not be included in the report.

For example, whether the activation status of the functionality is changed. "Previously" may be before the reception of the (first) signaling. "Currently" may be after the reception of the (first) signaling. The determination may be based on whether the functionality is activated (e.g., configured by an RRC message, activated by MAC CE, or activated by DCI) or deactivated (e.g., released by an RRC message, deactivated by MAC CE, or deactivated by DCI) previously, and whether the functionality is activated (e.g., configured by an RRC message, activated by MAC CE, or activated by DCI) or deactivated (e.g., released by an RRC message, deactivated by MAC CE, or deactivated by DCI) currently. The activation and/or deactivation may be by the NW and/or by the UE. If (at least) the functionality is (being) activated or deactivated previously, and the functionality is (being) activated or deactivated currently, the UE may initiate/generate/trigger an applicability report and/or indicate whether the functionality is applicable (or not applicable). If (at least) the activation status of the functionality is (being) changed, the UE may initiate/generate/trigger an applicability report and/or indicate whether the functionality is applicable (or not applicable). The functionality may be (or meet) one or more of the following (conditions): (1) Previously activated and currently activated; (2) Previously activated and currently deactivated; (3) Previously deactivated and currently activated; and/or (4) Previously deactivated and currently activated. The functionality (or functionalities) included in the report may be (or meet) one or more of the following (conditions): (1) Previously activated and currently activated; (2) Previously activated and currently deactivated; (3) Previously deactivated and currently activated; and/or (4) Previously deactivated and currently activated. The functionality (or functionalities) that is/are (or meet) one or more of the following (conditions) may not be included in the report: (1) Previously activated and currently activated; (2) Previously activated and currently deactivated; (3) Previously deactivated and currently activated; and/or (4) Previously deactivated and currently activated. If (at least) the activation status of the functionality is not (being) changed, the UE may not initiate/generate/trigger an applicability report and/or not indicate whether the functionality is applicable (or not applicable).

For example, whether the applicability status of the functionality is changed. "Previously" may be before the reception of the (first) signaling. "Currently" may be after the reception of the (first) signaling. The determination may be based on whether the functionality is applicable or not applicable previously, and whether the functionality is applicable or not applicable currently. If (at least) the functionality is (being) applicable or not applicable previously, and the functionality is (being) applicable or not applicable currently, the UE may initiate/generate/trigger an applicability report and/or indicate whether the functionality is applicable (or not applicable). If (at least) the applicability status of the functionality is (being) changed, the UE may initiate/generate/trigger an applicability report and/or indicate whether the functionality is applicable (or not applicable). The functionality may be (or meet) one or more of the following (conditions): (1) Previously applicable and currently not applicable; (2) Previously applicable and currently not applicable; (3) Previously not applicable and currently applicable; and/or (4) Previously not applicable and currently applicable. The functionality (or functionalities) included in the report may be (or meet) one or more of the following (conditions): (1) Previously applicable and currently not applicable; (2) Previously applicable and currently not applicable; (3) Previously not applicable and currently applicable; and/or (4) Previously not applicable and currently applicable. The functionality (or functionalities) that is/are (or meet) one or more of the following (conditions) may not be included in the report: (1) Previously applicable and currently not applicable; (2) Previously applicable and currently not applicable; (3) Previously not applicable and currently applicable; and/or (4) Previously not applicable and currently applicable. If (at least) the applicability status of the functionality is not (being) changed, the UE may not initiate/generate/trigger an applicability report and/or not indicate whether the functionality is applicable (or not applicable).

For example, whether the configuration status of the functionality is changed. "Previously" may be before the reception of the (first) signaling. "Currently" may be after the reception of the (first) signaling. The determination may be based on whether the functionality is reconfigured or not. If (at least) the functionality is (being) reconfigured (or not reconfigured), the UE may initiate/generate/trigger an applicability report and/or indicate whether the functionality is applicable (or not applicable). If (at least) the functionality is not (being) reconfigured, the UE may not initiate/generate/trigger an applicability report and/or not indicate whether the functionality is applicable (or not applicable). "Reconfigured" may be (or comprise) add, modify, and/or remove (or release). The functionality may be (or comprise) the (previously) configured functionality. The functionality (or functionalities) included in the report may be the (currently) configured functionality. The functionality (or functionalities) included in the report may be (or comprise) the functionalities that are applicable. The functionality (or functionalities) that are not applicable may not be included in the report. The functionality (or functionalities) included in the report may be the functionalities that are not applicable. The functionality (or functionalities) that are applicable may not be included in the report.

For the report of applicable and/or non-applicable functionalities, at least one or more enhancements below may be applied to the concepts above (e.g., Concept A, Concept B, etc.) to reduce design complexity and/or signaling overhead.

In the first example described above, in response to the third configuration, the UE may trigger/initiate/transmit a second report. The second report may indicate whether the (reconfigured) AI/ML functionality (e.g., the first functionality) is (or becomes) applicable (or not applicable). The UE may consider the (reconfigured) AI/ML functionality (e.g., the first functionality) as deactivated (e.g., after reconfiguration, if (at least) the AI/ML functionality becomes not applicable). The UE may consider the (reconfigured) AI/ML functionality (e.g., the first functionality) as activated (e.g., after reconfiguration, if (at least) the AI/ML functionality is applicable). The UE may (autonomously) change the status of the functionality (e.g., deactivate the functionality).

Alternatively and/or additionally in certain embodiments, in response to the third configuration, the UE may not trigger/initiate/transmit a second report. If a second report is triggered/initiated/transmitted (e.g., due to another/other reason), the second report may not indicate whether the (reconfigured) AI/ML functionality (e.g., the first functionality) is (or becomes) applicable (or not applicable).

In the second example described above, in response to the third configuration, the UE may not trigger/initiate/transmit a second report. If a second report is triggered/initiated/transmitted (e.g., due to another/other reason), the second report may not indicate whether the (removed) AI/ML functionality (e.g., the second functionality) is (or becomes) applicable (or not applicable). The UE may consider the (removed) AI/ML functionality (e.g., the second functionality) as deactivated (e.g., after removal, if (at least) the AI/ML functionality becomes not applicable). The UE may (autonomously) change the status of the functionality (e.g., deactivate the functionality).

Alternatively and/or additionally in certain embodiments, in response to the third configuration, the UE may trigger/initiate/transmit a second report. The second report may indicate whether the (removed) AI/ML functionality (e.g., the second functionality) is (or becomes) applicable (or not applicable). The second report may indicate that the (removed) AI/ML functionality (e.g., the second functionality) is not applicable.

In the third example described above, in response to the third configuration, the UE may trigger/initiate/transmit a second report. The second report may indicate whether the (reconfigured) AI/ML functionality (e.g., the third functionality) is (or becomes) applicable (or not applicable). The UE may consider the (reconfigured) AI/ML functionality (e.g., the third functionality) as deactivated (e.g., after reconfiguration, if (at least) the AI/ML functionality is not applicable). The UE may consider the (reconfigured) AI/ML functionality (e.g., the third functionality) as activated (e.g., after reconfiguration, if (at least) the AI/ML functionality becomes applicable). The UE may (autonomously) change the status of the functionality (e.g., activate the functionality).

Alternatively and/or additionally in certain embodiments, in response to the third configuration, the UE may not trigger/initiate/transmit a second report. If a second report is triggered/initiated/transmitted (e.g., due to another/other reason), the second report may not indicate whether the (reconfigured) AI/ML functionality (e.g., the third functionality) is (or becomes) applicable (or not applicable).

In the fourth example described above, in response to the third configuration, the UE may not trigger/initiate/transmit a second report. If a second report is triggered/initiated/transmitted (e.g., due to another/other reason), the second report may not indicate whether the (removed) AI/ML functionality (e.g., the fourth functionality) is (or becomes) applicable (or not applicable). The UE may consider the (removed) AI/ML functionality (e.g., the fourth functionality) as deactivated (e.g., after removal, if (at least) the AI/ML functionality becomes not applicable). The UE may (autonomously) change the status of the functionality (e.g., deactivate the functionality).

Alternatively and/or additionally in certain embodiments, in response to the third configuration, the UE may trigger/initiate/transmit a second report. The second report may indicate whether the (removed) AI/ML functionality (e.g., the fourth functionality) is (or becomes) applicable (or not applicable). The second report may indicate that the (removed) AI/ML functionality (e.g., the fourth functionality) is not applicable.

In the fifth example described above, in response to the third configuration, the UE may trigger/initiate/transmit a second report. The second report may indicate whether the (added) AI/ML functionality (e.g., the fifth functionality) is (or becomes) applicable (or not applicable). The UE may consider the (added) AI/ML functionality (e.g., the fifth functionality) as deactivated (e.g., after addition, if (at least) the AI/ML functionality is not applicable). The UE may consider the (added) AI/ML functionality (e.g., the fifth functionality) as activated (e.g., after addition, if (at least) the AI/ML functionality is applicable). The UE may (autonomously) change the status of the functionality (e.g., activate the functionality).

Alternatively and/or additionally in certain embodiments, in response to the third configuration, the UE may not trigger/initiate/transmit a second report. If a second report is triggered/initiated/transmitted (e.g., due to another/other reason), the second report may not indicate whether the (added) AI/ML functionality (e.g., the fifth functionality) is (or becomes) applicable (or not applicable).

In the sixth example described above, in response to the third configuration, the UE may not trigger/initiate/transmit a second report. If a second report is triggered/initiated/transmitted (e.g., due to another/other reason), the second report may not indicate whether the sixth functionality is (or becomes) applicable (or not applicable). The UE may consider the sixth functionality as deactivated (e.g., if (at least) the sixth functionality is not applicable). The UE may (autonomously) change the status of the functionality (e.g., deactivate the functionality).

Alternatively and/or additionally in certain embodiments, in response to the third configuration, the UE may trigger/initiate/transmit a second report. The second report may indicate whether the sixth functionality is (or becomes) applicable (or not applicable). The second report may indicate that the sixth functionality is applicable. The second report may indicate that the sixth functionality is not applicable.

Preferably in certain embodiments, in a combination of the above examples, a third configuration provides one or more AI/ML functionalities with either an add or modify operation. In response to the third configuration, the UE may trigger/initiate/transmit a second report. The second report may indicate whether the one or more added or modified AI/ML functionalities is (or becomes) applicable (or not applicable). The UE may consider the one or more AI/ML functionalities as deactivated (e.g., after addition or modification, if (at least) the one or more AI/ML functionalities is not applicable). The UE may consider the (added or modified) AI/ML functionality (e.g., the fifth functionality) as activated (e.g., after addition or modification, if (at least) the AI/ML functionality is applicable). The UE may (autonomously) change the status of the functionality (e.g., activate the functionality). Preferably in certain embodiments, if the third configuration provides another one or more AI/ML functionality IDs to be released or removed, the UE does not include, in the second report, applicability of the AI/ML functionality associated with the another one or more AI/ML functionality IDs. Preferably in certain embodiments, the second report does not comprise applicability of AI/ML functionality associated with (currently) applied/activated AI/ML functionality which is not indicated to be modified by the third configuration. Preferably in certain embodiments, if the third configuration (only) releases one or more AI/ML functionalities (via indicating one or more AI/ML functionality IDs/indexes) (and without adding or modifying AI/ML functionality), in response to the third configuration, the UE does not trigger/initiate/transmit a second report and/or the UE does not trigger/initiate/transmit for applicability.

The UE may not report (all) applicable and/or non-applicable functionalities to the NW. The NW may not include one or more functionalities in the report of applicable and/or non-applicable functionalities. The NW could indicate UE to report the applicability associated with a subset of one or more (AI/ML) functionalities.

For example, the UE may report (all) applicable and/or non-applicable functionalities to the NW.

For example, the UE may report (only) the concerned functionalities, when (or in response to) the UE reports the applicable and/or non-applicable functionalities (in response to the (first) signaling). The concerned functionalities may be the functionality (or functionalities) added, modified, and/or removed/released by the (first) signaling. The concerned functionalities may be the functionalities indicated by the NW or associated with the indications (or flags/parameters) provided by the NW (e.g., in the (first) signaling).

For example, the UE may report (only) the changed functionalities, when (or in response to) the UE reports the applicable and/or non-applicable functionalities. The changed functionalities may be the functionality (or functionalities) whose applicability status have changed (e.g., from applicable to non-applicable, or non-applicable to applicable).

For example, the NW may indicate the UE to report the applicable and/or non-applicable functionalities not reported in a later report (e.g., through UE Assistance Information (UAI) and/or RRCReconfigurationComplete).

For example, the NW may indicate the functionalities for the UE to report and/or not report.

For example, no matter whether there is a previous report (e.g., through UAI or RRCReconfigurationComplete) for applicability of one or more AI/ML functionalities, when/in response to receiving a third configuration (for configuring to add another one or more AI/ML functionalities or modify the one or more AI/ML functionalities), the UE reports the applicability associated with AI/ML functionalities based on the third configuration.

The UE may report the applicable and/or non-applicable functionalities using different types/formats/signalings.

For example, the NW may indicate the type, format, and/or signaling for the report of applicable and/or non-applicable functionalities. The UE may report the applicable and/or non-applicable functionalities based on the indication, when (or in response to) receiving the (first) signaling.

For example, the indication(s) (or flag(s)/parameter(s)) may be (the existence of) an Information Element (IE), sequence, list, number, integer, enum, bit string, or Boolean value. One value for the indication(s) (or flag(s)/parameter(s)) may be associated with one (type of) IE and/or signaling. One or more values for the indication(s) (or flag(s)/parameter(s)) may be associated with one or more (types of) IEs and/or signalings. The UE may use the associated (type(s) of) IE(s) and/or signaling(s) when indicated by the NW. The NW may indicate for a configuration/functionality, applicable functionalities, non-applicable functionalities, and/or individual configurations/functionalities.

For example, a (first) (type of) IE may be designed for reporting the applicable and/or non-applicable functionalities to the NW for the first time. The (first) (type of) IE may be designed for reporting the functionalities that has not been reported applicable and/or non-applicable to the NW.

For example, a (second) (type of) IE may be designed for updating the applicable and/or non-applicable functionalities. The (second) (type of) IE may be designed for reporting the applicable and/or non-applicable that has been reported applicable and/or non-applicable to the NW.

The (first) (type of) IE may be included in a second signaling (e.g., RRCReconfigurationComplete). The (second) (type of) IE may be included in a third signaling (e.g., UAI). The (first) (type of) IE may not be included in the (third) signaling. The (second) (type of) IE may be included in the (second) signaling.

Alternatively and/or additionally in certain embodiments, restriction(s) for an NW reconfiguration may be used. Modification(s) may not be allowed for the inference configurations related to AI/ML.

For example, the NW may be prohibited (or not allowed) to reconfigure (or modify) a functionality that is (currently) activated. A UE may not expect a functionality that is (currently) activated to be reconfigured (or modified) by the NW (if the functionality is related to or associated with AI/ML). The NW may (need to) deactivate the functionality before reconfiguring the functionality. If the NW wants to reconfigure the functionality, the NW may release (or remove) the functionality (first) and then add the functionality with the reconfigured parameter(s). Preferably in certain embodiments, the UE does not expect to receive a reconfiguration message such that a CSI-ReportConfig for inference is modified without being released first. Preferably in certain embodiments, with respect to a (currently) used/activated CSI-ReportConfig for inference, the UE does not expect that a reconfiguration message only indicates to modify the CSI-ReportConfig for inference without indicating releasing the CSI-ReportConfig.

For example, the NW may be prohibited (or not allowed) to reconfigure (or modify) a functionality that is (currently) applicable (if the functionality is related to or associated with AI/ML). A UE may not expect a functionality that is (currently) applicable to be reconfigured (or modified) by the NW. The NW may wait for the functionality to be not applicable before reconfiguring the functionality.

For example, the NW may have to first release/remove the configuration to be modified and add the modified configuration.

For example, when receiving the modification(s) to inference configuration(s), the UE may first perform procedures for removal/release, then perform procedures for addition.

In one or more examples, the UE may receive one or more inference configurations (related to AI/ML) in an RRCReconfiguration message (or the (first) signaling). A first list in the example(s) may be for adding and/or modifying one or more configurations (e.g., csi-ReportConfigToAddModList). A second list in the example(s) may be for removing and/or releasing one or more configurations (e.g., csi-ReportConfigToReleaseList). The UE may report or not report the applicable and/or non-applicable functionalities based on whether one or more configurations/functionalities are added, modified, and/or removed/released. The UE may report or not report one or more configurations/functionalities to be applicable and/or non-applicable based on whether one or more configurations/functionalities are added, modified, and/or removed/released.

For each configuration received (in the first list), when the configuration includes an ID (e.g., CSI-ReportConfigId) that is maintained by the UE (e.g., exists in one or more UE variables), or the UE performs (or does not perform) inference and/or reporting based on the configuration associated with the same ID, the received configuration may be a modification to an existing configuration.

For each configuration received (in the first list), when the configuration includes an ID (e.g., CSI-ReportConfigId) that is not maintained by the UE (e.g., exists in one or more UE variables), not configured/provided to the UE (before), and/or have been released by the NW/UE, the received configuration may be a (newly) added configuration.

For each configuration received (in the second list), when the received configurations (in the second list) include a configuration with an ID (e.g., CSI-ReportConfigId) that is maintained by the UE (e.g., exists in one or more UE variables), or the UE performs (or does not perform) inference and/or reporting based on the configuration associated with the same ID, the received configuration may be a release to an existing configuration.

When one or more configurations are added, modified, and/or released by the NW: (1) The UE may report the applicable functionalities; (2) The UE may include the added, modified, and/or released functionalities in the report of applicable functionalities; (3) The UE may not report the applicable functionalities; (4) The UE may not include the added, modified, and/or released functionalities in the report of applicable functionalities; (5) The UE may report the non-applicable functionalities; (6) The UE may include the added, modified, and/or released functionalities in the report of non-applicable functionalities; (7) The UE may not report the non-applicable functionalities; and/or (8) The UE may not include the added, modified, and/or released functionalities in the report of non-applicable functionalities. One or more of the options may be combined, in whole or in part.

In one or more examples, the UE may receive one or more inference configurations (related to AI/ML) in an RRCReconfiguration message (or the (first) signaling). A first list in the example(s) may be for adding and/or modifying one or more configurations (e.g., csi-ReportConfigToAddModList). A second list in the example(s) may be for removing and/or releasing one or more configurations (e.g., csi-ReportConfigToReleaseList). One or more indications (or flags/parameters) may be included in the message (or the (first) signaling). The UE may report or not report the applicable and/or non-applicable functionalities based on the indication(s) (or flag(s)/parameter(s)). The UE may report or not report one or more configurations/functionalities to be applicable and/or non-applicable based on the indication(s) (or flag(s)/parameter(s)).

For example, the indication(s) (or flag(s)/parameter(s)) may be within one or more inference configuration(s) (e.g., within CSI-ReportConfig).

For example, the indication(s) (or flag(s)/parameter(s)) may be not within the inference configurations (e.g., within CSI-MeasConfig instead of CSI-ReportConfig).

For example, the indication(s) (or flag(s)/parameter(s)) may be associated with one or more functionalities/configurations.

For example, the indication(s) (or flag(s)/parameter(s)) may be (the existence of) an IE, sequence, list, number, integer, enum, bit string, or Boolean value.

For example, the indication(s) (or flag(s)/parameter(s)) may be set to a first value (e.g., true, value that does not correspond to zero/empty/invalid) or does exist. For example, indication(s) (or flag(s)/parameter(s)) may be set to a second value (e.g., false, value that corresponds to zero/empty/invalid) or does not exist.

When one or one or more indications (or flags/parameters) received by the UE is set to the first/second value: (1) The UE may report the applicable functionalities; (2) The UE may include the functionalities associated with the indication(s) (or flag(s)/parameter(s)) set to the first/second value in the report of applicable functionalities; (3) The UE may not report the applicable functionalities; (4) The UE may not include the functionalities associated with the indication(s) (or flag(s)/parameter(s)) set to the first/second value in the report of applicable functionalities; (5) The UE may report the non-applicable functionalities; (6) The UE may include the functionalities associated with the indication(s) (or flag(s)/parameter(s)) set to the first/second value in the report of non-applicable functionalities; (7) The UE may not report the non-applicable functionalities; and/or (8) The UE may not include the functionalities associated with the indication(s) (or flag(s)/parameter(s)) set to the first/second value in the report of non-applicable functionalities. One or more of the options may be combined, in whole or in part.

Various examples and embodiments of the present invention are described below. For the methods, alternatives, aspects, concepts, examples, and embodiments detailed above and herein, the following aspects and embodiments are possible.

Figure 12:
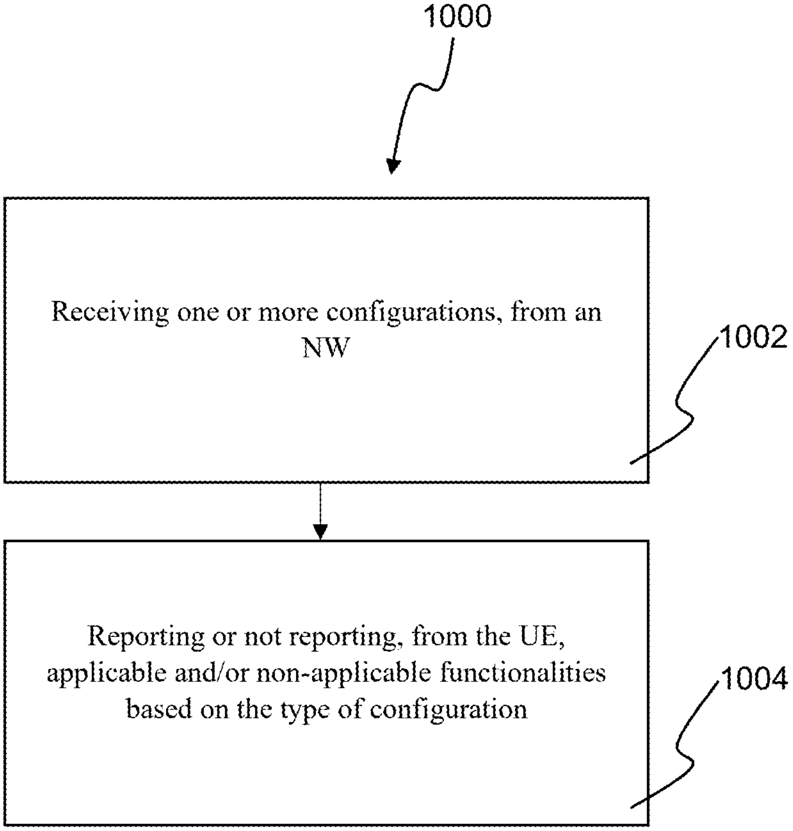
FIG. 12 is a flow diagram of a method of a UE in a wireless communication system comprising receiving one or more configurations, from an NW, and reporting or not reporting, from the UE, applicable and/or non-applicable functionalities based on the type of configuration, in accordance with embodiments of the present invention.

Referring to FIG. 12, with this and other concepts, systems, and methods of the present invention, a method 1000 for a UE in a wireless communication system comprises receiving one or more configurations, from an NW (step 1002), and reporting or not reporting, from the UE, applicable and/or non-applicable functionalities based on the type of configuration (step 1004).

In various embodiments, the one or more configurations may be related to the inference of an AI/ML functionality.

In various embodiments, the type of configuration is addition, modification, or release of one or more configurations.

In various embodiments, the report includes a subset of applicable and/or non-applicable functionalities based on the added, modified, or released configurations.

In various embodiments, the UE reports when a configuration is added.

In various embodiments, the UE reports when a configuration is modified.

In various embodiments, the UE does not report when a configuration is released.

In various embodiments, the UE reports the configurations added, modified, or released.

In various embodiments, the UE does not report the configurations not added, modified, or released.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) receive one or more configurations, from an NW; and (ii) report or not report, from the UE, applicable and/or non-applicable functionalities based on the type of configuration. Moreover, the CPU 308 can execute the program code 312 to perform all of the described actions, steps, and methods described above, below, or otherwise herein.

Referring back to FIGS. 3 and 4, in one or more embodiments from the perspective of an NW in a wireless communication system, the device 300 includes a program code 312 stored in memory 310 of the transmitter. The CPU 308 could execute program code 312 to: (i) transmit one or more configurations, to a UE and (ii) determining to report or not report, by the UE, applicable and/or non-applicable functionalities based on the type of configuration. Moreover, the CPU 308 can execute the program code 312 to perform all of the described actions, steps, and methods described above, below, or otherwise herein.

Figure 13:
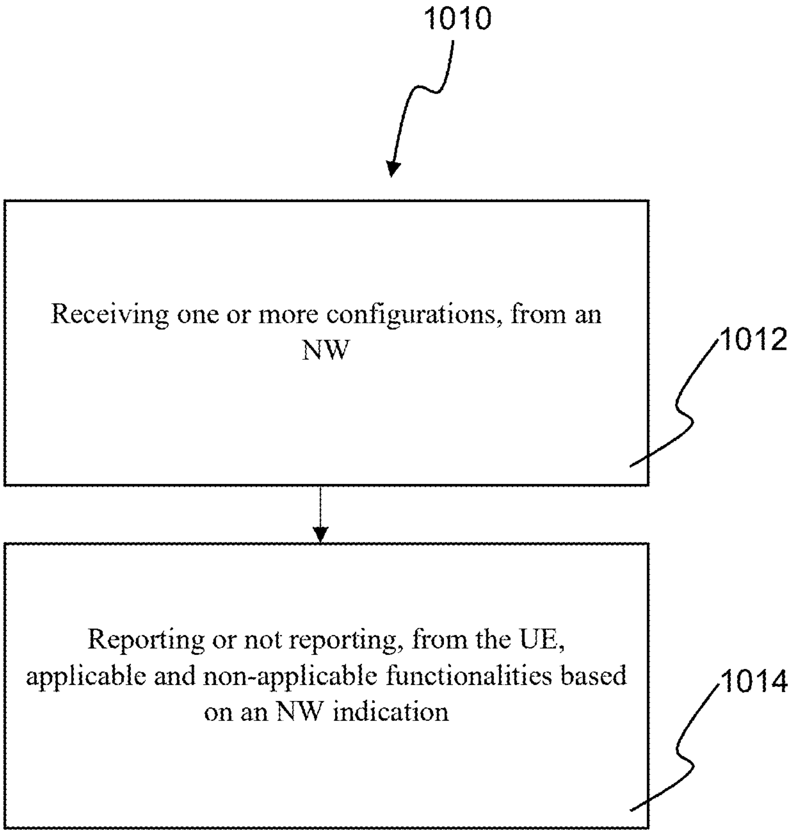
FIG. 13 is a flow diagram of a method of a UE in a wireless communication system comprising receiving one or more configurations, from an NW, reporting or not reporting, from the UE, applicable and non-applicable functionalities based on an NW indication, in accordance with embodiments of the present invention.

Referring to FIG. 13, with this and other concepts, systems, and methods of the present invention, a method 1010 for a UE in a wireless communication system comprises receiving one or more configurations, from an NW (step 1012), reporting or not reporting, from the UE, applicable and non-applicable functionalities based on an NW indication (step 1014).

In various embodiments, the configuration(s) may be related to the inference of an AI/ML functionality.

In various embodiments, the NW indicates the UE to report the applicable functionalities.

In various embodiments, the NW indicates the UE to not report the applicable functionalities.

In various embodiments, the NW indicates the UE to report the non-applicable functionalities.

In various embodiments, the NW indicates the UE to not report the non-applicable functionalities.

In various embodiments, the NW indicates the functionalities for the UE to report.

In various embodiments, the NW indicates the functionalities for the UE to not report.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) receive one or more configurations, from an NW; and (ii) report or not report, from the UE, applicable and non-applicable functionalities based on an NW indication. Moreover, the CPU 308 can execute the program code 312 to perform all of the described actions, steps, and methods described above, below, or otherwise herein.

Referring back to FIGS. 3 and 4, in one or more embodiments from the perspective of an NW in a wireless communication system, the device 300 includes a program code 312 stored in memory 310 of the transmitter. The CPU 308 could execute program code 312 to: (i) transmit one or more configurations, to a UE; and (ii) determining to report or not report, by the UE, applicable and non-applicable functionalities based on an indication from the NW. Moreover, the CPU 308 can execute the program code 312 to perform all of the described actions, steps, and methods described above, below, or otherwise herein.

Figure 14:
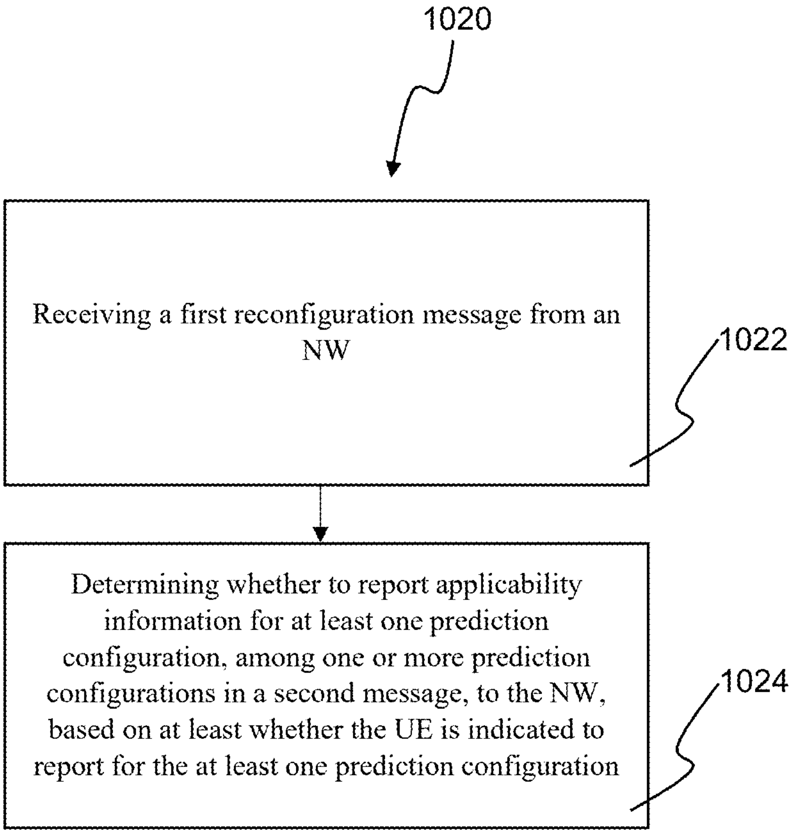
FIG. 14 is a flow diagram of a method of a UE in a wireless communication system comprising receiving a first reconfiguration message from an NW, and determining whether to report applicability information for at least one prediction configuration, among one or more prediction configurations, in a second message, to the NW, based on at least whether the UE is indicated to report for the at least one prediction configuration, in accordance with embodiments of the present invention.

Referring to FIG. 14, with this and other concepts, systems, and methods of the present invention, a method 1020 for a UE in a wireless communication system comprises receiving a first reconfiguration message from an NW (step 1022), and determining whether to report applicability information for at least one prediction configuration, among one or more prediction configurations, in a second message, to the NW, based on at least whether the UE is indicated to report for the at least one prediction configuration (step 1024).

In various embodiments, the UE determines to report applicability information for a first prediction configuration, among the one or more prediction configurations, in the second message if (at least) the UE is indicated to report (applicability information) for the first prediction configuration.

In various embodiments, the UE determines not to report applicability information for a second prediction configuration, among the one or more prediction configurations, in the second message if (at least) the UE is indicated to not report (applicability information) for the second prediction configuration.

In various embodiments, the UE is indicated to report or not report (applicability information) for the one or more prediction configurations using one or more indications.

In various embodiments, when the one or more indications are set or configured to a first value, the UE is indicated to not report (applicability information) for the one or more prediction configurations.

In various embodiments, when the one or more indications are set or configured to a second value, the UE is indicated to report (applicability information) for the one or more prediction configurations.

In various embodiments, when the one or more indications do exist, the UE is indicated to not report (applicability information) for the one or more prediction configurations.

In various embodiments, when the one or more indications do not exist, the UE is indicated to report (applicability information) for the one or more prediction configurations.

In various embodiments, each indication is associated with one of the one or more prediction configurations, a subset of the one or more prediction configurations, or all of the one or more prediction configurations.

In various embodiments, each prediction configuration of the subset is associated with a same prediction functionality.

In various embodiments, each prediction configuration of the subset is, or comprises, CSI-ReportConfig associated with prediction for beam management, and/or CSI-ReportConfig associated with spatial or temporal domain beam prediction.

In various embodiments, the UE determines not to report applicability information for the second prediction configuration, in the second message, when one or more of the following conditions are met: (i) the second configuration is not added or modified in the first reconfiguration message; and (ii) the applicability status for the second configuration has not changed.

In various embodiments, the second message is, or comprises, one or more of: (i) a complete message in response to the first reconfiguration message; and (ii) a UAI message.

In various embodiments, the UE determines whether to report applicability information for the one or more sets of prediction related parameters based on one or more of: (i) whether the at least one set of prediction related parameters is added or modified in the first reconfiguration message; and (ii) whether the applicability status for the at least one set of prediction related parameters has changed.

In various embodiments, the UE determines whether to report applicability information for the one or more sets of prediction related parameters when one or more of the following conditions are met: (i) at least one set of prediction related parameters is added or modified in the first reconfiguration message; and (ii) the applicability status for the at least one set of prediction related parameters has changed.

In various embodiments, the method further comprises determining whether to report the applicability information in the second message, to the NW, based on whether the applicability information for at least one of the one or more prediction related configurations is reported to the NW.

In various embodiments, the UE determines to report the applicability information if the applicability information for at least one of the one or more prediction related configurations is reported to the NW in a previous message before the second message.

In various embodiments, the method further comprises reporting the applicability information in the second message, wherein the reporting comprises the applicability information for one or more of the one or more prediction related configurations meeting one or more conditions, including: (i) indication to be applicable in the second message and reported not applicable to the NW in a previous message before the second message, and/or (ii) indication to be not applicable in the second message and reported applicable to the NW in a previous message before the second message.

In various embodiments, the method further comprises reporting the applicability information in a third message, to the NW, wherein: the reporting is for one or more of the one or more prediction related configurations whose applicability status has changed, the reporting is performed when the applicability status for at least one of the one or more prediction related configurations has changed, and/or the third message is transmitted at a timing earlier than the second message.

In various embodiments, a prediction related configuration is, or comprises, a prediction configuration or a set of prediction related parameters;

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) receive a first reconfiguration message from an NW; and (ii) determine whether to report applicability information for at least one prediction configuration, among one or more prediction configurations, in a second message, to the NW, based on at least whether the UE is indicated to report for the at least one prediction configuration. Moreover, the CPU 308 can execute the program code 312 to perform all of the described actions, steps, and methods described above, below, or otherwise herein.

Figure 15:
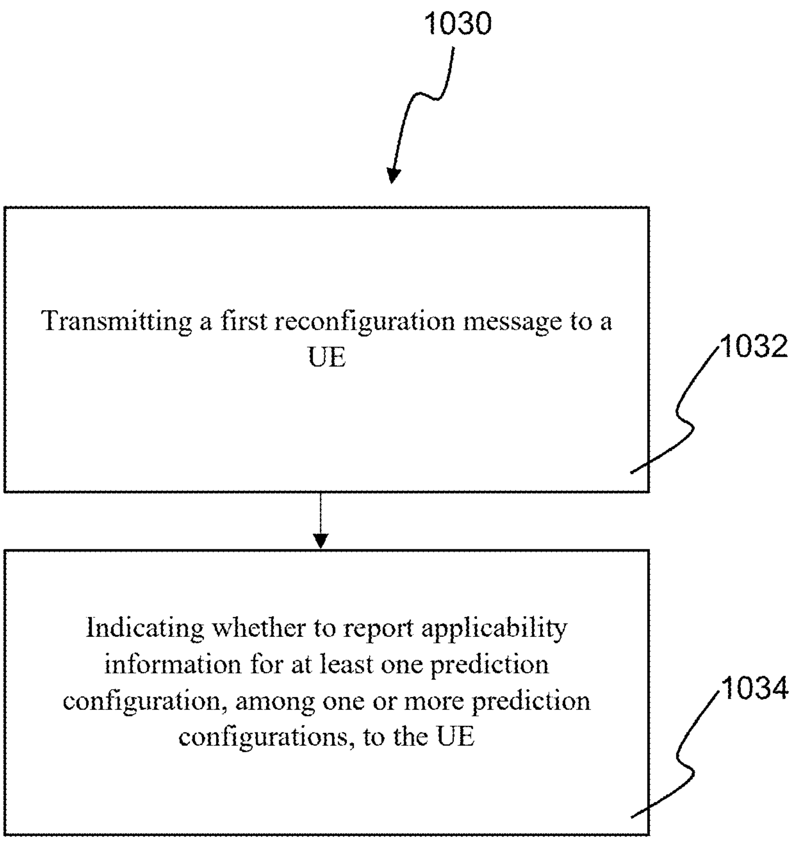
FIG. 15 is a flow diagram of a method of an NW in a wireless communication system comprising transmitting a first reconfiguration message to a UE, and indicating whether to report applicability information for at least one prediction configuration, among one or more prediction configurations, to the UE, in accordance with embodiments of the present invention.

Referring to FIG. 15, with this and other concepts, systems, and methods of the present invention, a method 1030 for an NW in a wireless communication system comprises transmitting a first reconfiguration message to a UE (step 1032), and indicating whether to report applicability information for at least one prediction configuration, among one or more prediction configurations, to the UE (step 1034).

In various embodiments, the method further comprises receiving a second message, from the UE.

In various embodiments, the NW indicates the UE to report or not report (applicability information) for the one or more prediction configurations using one or more indications.

In various embodiments, when the one or more indications are set or configured to a first value, the NW indicates the UE to not report (applicability information) for the one or more prediction configurations.

In various embodiments, when the one or more indications are set or configured to a second value, the NW indicates the UE to report (applicability information) for the one or more prediction configurations.

In various embodiments, when the one or more indications do exist, the NW indicates the UE to not report (applicability information) for the one or more prediction configurations.

In various embodiments, when the one or more indications do not exist, the NW indicates the UE to report (applicability information) for the one or more prediction configurations.

In various embodiments, each indication is associated with one of the one or more prediction configurations, a subset of the one or more prediction configurations, or all of the one or more prediction configurations, In various embodiments, each prediction configuration of the subset is associated with a same prediction functionality.

In various embodiments, each prediction configuration of the subset is, or comprises, CSI-ReportConfig associated with prediction for beam management, and/or CSI-ReportConfig associated with spatial or temporal domain beam prediction.

In various embodiments, the one or more prediction configurations correspond to CSI-ReportConfig associated with prediction, CSI-ReportConfig associated with prediction for beam management, and/or CSI-ReportConfig associated with spatial or temporal domain beam prediction.

In various embodiments, the second message comprises applicability information for a first prediction configuration, among the one or more prediction configurations, if the NW indicates the UE to report (applicability information) for the first prediction configuration.

In various embodiments, the first prediction configuration meets one or more of the following conditions: (i) added or modified in the first reconfiguration message; and (ii) applicability status has changed.

In various embodiments, the second message does not comprise applicability information for a second prediction configuration, among the one or more prediction configurations, if the NW indicates the UE to not report (applicability information) for the second prediction configuration.

In various embodiments, the method further comprises receiving applicability information for one or more sets of prediction related parameters in the second message.

In various embodiments, wherein the one or more sets of prediction related parameters meet one or more of the following conditions: (i) added or modified in the first reconfiguration message; and (ii) applicability status has changed.

In various embodiments, the second message is, or comprises, one or more of: (i) a complete message in response to the first reconfiguration message; and (ii) a UAI message.

Referring back to FIGS. 3 and 4, in one or more embodiments from the perspective of an NW in a wireless communication system, the device 300 includes a program code 312 stored in memory 310 of the transmitter. The CPU 308 could execute program code 312 to: (i) transmit a first reconfiguration message to a UE; and (ii) indicate whether to report applicability information for at least one prediction configuration, among one or more prediction configurations, to the UE. Moreover, the CPU 308 can execute the program code 312 to perform all of the described actions, steps, and methods described above, below, or otherwise herein.

Any combination of the above or herein concepts or teachings can be jointly combined, in whole or in part, or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a User Equipment (UE), comprising:

receiving one or more first reconfiguration messages from a Network (NW), indicating not to report applicability information for at least one prediction configuration, among one or more prediction configurations;

determining whether to report applicability information to the NW for the at least one prediction configuration in a second message, based on at least whether the UE is indicated to report for the at least one prediction configuration; and transmitting the second message to the NW, wherein:

the second message does not comprise applicability information for the at least one prediction configuration, wherein the at least one prediction configuration is for the UE to perform inference, and the second message comprises applicability information for one or more sets of prediction related parameters, wherein the one or more sets of prediction related parameters are for the UE to report applicability information.

2. The method of claim 1, wherein the UE determines to report applicability information for a first prediction configuration, among the one or more prediction configurations in the second message, if at least the UE is indicated to report for the first prediction configuration.

3. The method of claim 2, further comprising:

reporting applicability information for the first prediction configuration, in the second message; or not reporting applicability information for the second prediction configuration, in the second message.

4. The method of claim 2, wherein the first prediction configuration meets one or more of the following conditions:

(i) added or modified in the first reconfiguration message; and (ii) applicability status has changed.

5. The method of claim 2, wherein the UE determines to report applicability information for the first prediction configuration, in the second message, when one or more of the following conditions are met: (i) the first prediction configuration is added or modified in the first reconfiguration message; and (ii) applicability status for the first prediction configuration has changed, or wherein the UE determines not to report applicability information for the second prediction configuration, in the second message, when one or more of the following conditions are met: (i) the second prediction configuration is not added or modified in the first reconfiguration message; and (ii) applicability status for the second prediction configuration has not changed.

6. The method of claim 1, wherein at least one of:

the UE is indicated to report or not report for the one or more prediction configurations using one or more indications, each indication is associated with one of the one or more prediction configurations, a subset of the one or more prediction configurations, or all of the one or more prediction configurations, or each prediction configuration of the subset is associated with a same prediction functionality.

7. The method of claim 1, wherein the one or more prediction configurations correspond to Channel State Information (CSI)-ReportConfig associated with prediction, CSI-ReportConfig associated with prediction for beam management, and/or CSI-ReportConfig associated with spatial or temporal domain beam prediction.

8. The method of claim 1, wherein at least one of the one or more first reconfiguration messages includes an indication indicating not to report applicability information for the at least one prediction configuration.

9. The method of claim 1, wherein the one or more sets of prediction related parameters meet one or more of the following conditions:

(i) added or modified in the first reconfiguration message; and (ii) applicability status has changed.

10. The method of claim 1, wherein the determination whether to report applicability information is further based on one or more of:

(i) whether the at least one prediction configuration is added or modified in the first reconfiguration message; and (ii) whether the applicability status for the at least one prediction configuration has changed.

11. The method of claim 1, wherein the second message is, or comprises, one or more of: (i) a complete message in response to the first reconfiguration message; and (ii) a UE Assistance Information (UAI) message.

12. A method of a Network (NW), comprising:

transmitting one or more first reconfiguration messages to a User Equipment (UE), indicating not to report applicability information for at least one prediction configuration, among one or more prediction configurations; and receiving a second message from the UE, wherein:

the second message does not comprise applicability information for the at least one prediction configuration, wherein the at least one prediction configuration is for the UE to perform inference, and the second message comprises applicability information for one or more sets of prediction related parameters, wherein the one or more sets of prediction related parameters are for the UE to report applicability information.

13. The method of claim 12, wherein:

the second message comprises applicability information for a first prediction configuration, among the one or more prediction configurations, if the NW indicates the UE to report for the first prediction configuration.

14. The method of claim 13, wherein the first prediction configuration meets one or more of the following conditions:

(i) added or modified in the first reconfiguration message; and (ii) applicability status has changed.

15. The method of claim 12, further comprising receiving applicability information for the one or more sets of prediction related parameters in the second message.

16. The method of claim 12, wherein the second message is, or comprises, one or more of:

(i) a complete message in response to the first reconfiguration message; and (ii) a UE Assistance Information (UAI) message.

17. The method of claim 12, wherein at least one of:

the NW indicates the UE to report or not report for the one or more prediction configurations using one or more indications, each indication is associated with one of the one or more prediction configurations, a subset of the one or more prediction configurations, or all of the one or more prediction configurations, or each prediction configuration of the subset is associated with a same prediction functionality.

18. The method of claim 12, wherein the one or more prediction configurations correspond to Channel State Information (CSI)-ReportConfig associated with prediction, CSI-ReportConfig associated with prediction for beam management, and/or CSI-ReportConfig associated with spatial or temporal domain beam prediction.

* * * * *